(12) United States Patent
Shiiyama

(10) Patent No.: US 7,738,700 B2
(45) Date of Patent: Jun. 15, 2010

(54) IMAGE PROCESSING APPARATUS, CONTROL METHOD THEREFOR, AND PROGRAM

(75) Inventor: Hirotaka Shiiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1161 days.

(21) Appl. No.: 11/331,311

(22) Filed: Jan. 11, 2006

(65) Prior Publication Data

US 2009/0324075 A1   Dec. 31, 2009

(30) Foreign Application Priority Data

Jan. 11, 2005 (JP) .............................. 2005-004347

(51) Int. Cl.
*G06K 9/00* (2006.01)
*G06K 9/32* (2006.01)
*G06K 9/64* (2006.01)

(52) U.S. Cl. ..................... 382/170; 382/294; 382/218

(58) Field of Classification Search ......... 382/168–172, 382/112, 218, 284, 293–295
See application file for complete search history.

(56) References Cited

U.S. PATENT DOCUMENTS

| | | | |
|---|---|---|---|
| 5,757,981 A * | 5/1998 | Kawakubo ................ | 382/293 |
| 6,021,231 A * | 2/2000 | Miyatake et al. ........... | 382/305 |
| 6,205,239 B1 * | 3/2001 | Lin et al. ................... | 382/149 |
| 6,351,556 B1 * | 2/2002 | Loui et al. ................. | 382/164 |
| 6,631,209 B1 * | 10/2003 | Kanamori .................. | 382/169 |
| 6,865,288 B1 * | 3/2005 | Shishido et al. ............ | 382/145 |
| 6,904,163 B1 * | 6/2005 | Fujimura et al. ........... | 382/131 |
| 7,166,816 B1 * | 1/2007 | Chen et al. ............. | 219/121.41 |
| 7,418,135 B2 * | 8/2008 | Shiiyama ................... | 382/181 |
| 7,430,319 B2 * | 9/2008 | Hyoki et al. ............... | 382/168 |
| 2005/0271261 A1 * | 12/2005 | Onishi et al. .............. | 382/149 |

FOREIGN PATENT DOCUMENTS

| | | |
|---|---|---|
| JP | 01-181167 A | 7/1989 |
| JP | 2003-248827 | 9/2003 |
| JP | 2003-346081 A | 12/2003 |

OTHER PUBLICATIONS

Eli Saber, A. Murat Tekalp, Region-Based Shape Matching for Automatic Image Annotation and Query-by-Example, Journal of Visual Communication and Image Representation, vol. 8, Issue 1, Mar. 1997, pp. 3-20, ISSN 1047-3203.*
The above references were cited in a Mar. 23, 2009 Japanese Office Action that issued in Japanese Patent Application No. 2005-004347, which is enclosed without English Translation.

* cited by examiner

*Primary Examiner*—Vu Le
*Assistant Examiner*—Andrae S Allison
(74) *Attorney, Agent, or Firm*—Cowan, Liebowitz & Latman, P.C.

(57) ABSTRACT

The horizontal and vertical projection histograms of an image to be processed are calculated. The autocorrelation values of the calculated horizontal and vertical projection histograms are calculated, and horizontal and vertical object sizes until the autocorrelation values decrease to predetermined thresholds are calculated. The aspect ratio estimate value of the circumscribed rectangle of an object serving as a comparison region candidate in the image to be processed is calculated on the basis of the calculation results. The comparison region candidate is corrected on the basis of the aspect ratio estimate value, determining a final comparison region.

20 Claims, 19 Drawing Sheets

FIG. 7

|  | DIVISION COUNT 16 | DIVISION COUNT 32 | DIVISION COUNT 64 |
|---|---|---|---|
| LATERAL DIMENSION OF COMPARISON SOURCE : 150 | 9, REMAINDER 6 | 4, REMAINDER 22 | 2, REMAINDER 22 |
| LATERAL DIMENSION OF COMPARISON DESTINATION : 300 | 18, REMAINDER 12 | 9, REMAINDER 16 | 4, REMAINDER 44 |

FIG. 9
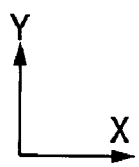
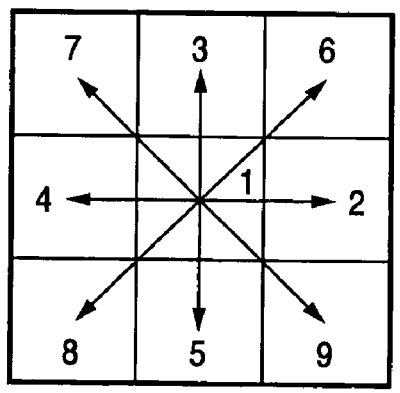
UNIT VECTOR OF
EACH DIRECTION
UNIT VECTOR IN BLOCK POSITION
SHIFTING DIRECTION
V(1)=(0, 0)
V(2)=(1, 0)
V(3)=(0, 1)
V(4)=(−1, 0)
V(5)=(0, −1)
V(6)=(1, 1)
V(7)=(−1, 1)
V(8)=(−1, −1)
V(9)=(1, −1)

IMAGE PROCESSING APPARATUS, CONTROL METHOD THEREFOR, AND PROGRAM

FIELD OF THE INVENTION

The present invention relates to an image processing apparatus which executes image processing for determining a comparison region used to perform similarity comparison between a comparison source image and a comparison destination image, a control method therefor, and a program.

BACKGROUND OF THE INVENTION

As a conventional technique of calculating the homothetic ratio of two images, a technique disclosed in Japanese Patent Laid-Open No. 2003-248827 is known. In Japanese Patent Laid-Open No. 2003-248827, the homothety between a reference image and a check image is calculated to perform similarity collation (similarity comparison) between them. At this time, both the homothetic ratio and the translation amount of a comparison region between the projection waveforms of the reference image are calculated. Homothetic transformation and position correction are performed on the basis of the homothetic ratio and translation amount to achieve a detailed comparison.

In order to calculate the translation amount and homothetic ratio, they are estimated for combinations of the peak positions of the projection waveform of a reference image and those of the projection waveform of a check image. Estimate homothetic transformation parameters including translation amounts and homothetic ratios which are estimated for respective combinations are generated. Of the estimate homothetic transformation parameters, a parameter of high likelihood is determined as a homothetic transformation parameter.

However, in Japanese Patent Laid-Open No. 2003-248827, many combinations of the peak positions of the projection waveform of a reference image and those of the projection waveform of a check image must be used to estimate the translation amount and homothetic ratio. No sufficient number of peaks of the projection waveform may be obtained from an image having a small feature. To the contrary, many features require a long time for calculation processing. The peaks of the projection waveform may vary due to factors such as noise and a stain, failing to obtain an accurate result.

In this manner, simultaneous calculation of the translation amount and homothetic ratio has both a merit and demerit.

It is safer to robustly calculate the translation amount and homothetic ratio at different stages while avoiding the influence of factors such as noise and a stain, than to simultaneously calculate the translation amount and homothetic ratio. This calculation method is preferably employed to efficiently implement similarity comparison.

The present invention has been made to overcome the conventional drawbacks, and has as its object to provide an image processing apparatus capable of efficiently executing similarity comparison between images at high precision, a control method therefor, and a program.

SUMMARY OF THE INVENTION

According to the present invention, the foregoing object is attained by providing an image processing apparatus which executes image processing of determining a comparison region used to perform similarity comparison between a comparison source image and a comparison destination image, comprising:

histogram calculation means for calculating horizontal and vertical projection histograms of an image to be processed;

object size calculation means for calculating autocorrelation values of the horizontal and vertical projection histograms which are calculated by the histogram calculation means, and calculating horizontal and vertical object sizes until the autocorrelation values decrease to predetermined thresholds;

aspect ratio estimate value calculation means for calculating an aspect ratio estimate value of a circumscribed rectangle of an object serving as a comparison region candidate in the image to be processed, on the basis of calculation results of the object size calculation means; and comparison region determination means for correcting the comparison region candidate on the basis of the aspect ratio estimate value calculated by the aspect ratio estimate value calculation means, and determining a final comparison region.

In a preferred embodiment, the apparatus further comprises homothetic ratio calculation means for calculating a homothetic ratio estimate value of circumscribed rectangles of objects serving as comparison region candidates in the comparison source image and the comparison destination image on the basis of the calculation results of the object size calculation means, wherein the comparison region determination means corrects the comparison region candidate on the basis of the aspect ratio estimate value calculated by the aspect ratio estimate value calculation means and the homothetic ratio estimate value calculated by the homothetic ratio calculation means, and determines the final comparison region.

In a preferred embodiment, the homothetic ratio calculation means calculates a first homothetic ratio estimate value in a horizontal direction and a second homothetic ratio estimate value in a vertical direction between the circumscribed rectangles of the objects serving as the comparison region candidates in the comparison source image and the comparison destination image on the basis of the calculation results of the object size calculation means.

In a preferred embodiment, the aspect ratio estimate value calculation means calculates a first aspect ratio estimate value of a circumscribed rectangle of an object serving as a comparison region candidate in the comparison source image and a second aspect ratio estimate value of a circumscribed rectangle of an object serving as a comparison region candidate in the comparison destination image on the basis of the calculation results of the object size calculation means.

According to the present invention, the foregoing object is attained by providing an image processing apparatus which executes image processing of determining a comparison region used to perform similarity comparison between a comparison source image and a comparison destination image, comprising:

calculation means for calculating projection histograms of the comparison source image and the comparison destination image;

comparison region candidate determination means for determining comparison region candidates used to perform similarity comparison between the comparison source image and the comparison destination image on the basis of the projection histograms calculated by the calculation means; and comparison region determination means for determining a final comparison region by correcting the comparison region candidates on the basis of at least one of aspect ratio estimate values of circumscribed rectangles of objects serving as comparison region candidates in the comparison source image and the comparison destination image that are calculated on the basis of the projection histograms calculated by the calculation means, and a homothetic ratio estimate value of the circumscribed rectangles of the objects serving as the comparison region candidates in the comparison source image and the comparison destination image.

In a preferred embodiment, the comparison region determination means sets, of the comparison region candidates in the comparison source image and the comparison destination image, as an image β, an image A whose circumscribed rectangle of the object is known in advance to be likely to have a value different from an original value, sets, as an image α, an image B whose circumscribed rectangle of the object is known in advance to be expected to have a value closer to an original value than the circumscribed rectangle of the object of the image A, and corrects the image β preferentially to the image α to determine a final comparison region.

In a preferred embodiment, the comparison region determination means sets each of the comparison region candidates in the comparison source image and the comparison destination image as the image α or the image β on the basis of an average of a first aspect ratio estimate value of the circumscribed rectangle of the object in the comparison source image, and a second aspect ratio estimate value of the circumscribed rectangle of the object in the comparison destination image.

In a preferred embodiment, the homothetic ratio estimate value includes a first homothetic ratio estimate value in a horizontal direction and a second homothetic ratio estimate value in a vertical direction for the circumscribed rectangle of the object, and the comparison region determination means uses one of the image α and the image β to correct the other image on the basis of a difference between the first homothetic ratio estimate value and the second homothetic ratio estimate value.

In a preferred embodiment, when the difference between the first homothetic ratio estimate value and the second homothetic ratio estimate value is not more than a predetermined threshold, the comparison region determination means uses one of a size of the image α and a size of the image β to correct the other image on the basis of a first absolute value of a difference between the first homothetic ratio estimate value and a first homothetic ratio in the horizontal direction between the comparison region candidates in the comparison source image and the comparison destination image, and a second absolute value of a difference between the second homothetic ratio estimate value and a second homothetic ratio in the vertical direction between the comparison region candidates in the comparison source image and the comparison destination image.

In a preferred embodiment, when the difference between the first homothetic ratio estimate value and the second homothetic ratio estimate value is larger than the predetermined threshold, the comparison region determination means uses one of the first homothetic ratio estimate value and the second homothetic ratio estimate value and one of the size of the image α and the size of the image β to correct the other image on the basis of a first homothetic ratio, a second homothetic ratio, the first homothetic ratio estimate value, and the second homothetic ratio estimate value.

In a preferred embodiment, the apparatus further comprises comparison means for executing similarity comparison between the comparison source image and the comparison destination image by using the comparison region determined by the comparison region determination means.

In a preferred embodiment, the apparatus further comprises control means for canceling comparison by the comparison means on the basis of the first homothetic ratio, the second homothetic ratio, the first homothetic ratio estimate value, and the second homothetic ratio estimate value.

In a preferred embodiment, the apparatus further comprises optimization means for optimizing coordinates of the comparison region determined by the comparison region determination means.

In a preferred embodiment, the optimization means comprises area difference calculation means for calculating an area difference between an area of one of the circumscribed rectangles of the objects serving as the comparison region candidates in the comparison source image and the comparison destination image that is calculated on the basis of the projection histogram calculated by the calculation means, and an area of the comparison region determined by the comparison region determination means, and determination means for determining the coordinates of the comparison region on the basis of the area difference calculated by the area difference calculation means by using one of the circumscribed rectangles of the objects serving as the comparison region candidates in the comparison source image and the comparison destination image.

In a preferred embodiment, when the area difference is smaller than a predetermined threshold, the determination means determines, as the coordinates of the comparison region, coordinates of an arbitrary region in the circumscribed rectangle of the object which has the area of the comparison region determined by the comparison region determination means and is used for calculation by the area difference calculation means.

In a preferred embodiment, wherein the determination means comprises first calculation means for calculating a first feature amount by dividing, into blocks, a circumscribed rectangle of an object of an image having a smaller size difference out of size differences between a size of the comparison region determined by the comparison region determination means and sizes of the circumscribed rectangles of the objects serving as the comparison region candidates in the comparison source image and the comparison destination image, second calculation means for setting a plurality of comparison region candidates having the size of the comparison region in an object region of a circumscribed rectangle of an object of an image having a larger size difference, dividing each of the plurality of comparison region candidates into blocks, and calculating second feature amounts of the plurality of comparison region candidates, comparison means for comparing the first feature amount and the second feature amounts, and selection means for selecting one of the plurality of comparison region candidates on the basis of a comparison result of the comparison means, when the area difference is not less than a predetermined threshold, the determination means determines coordinates of the comparison region candidate selected by the selection means as the coordinates of the comparison region.

According to the present invention, the foregoing object is attained by providing a method of controlling an image processing apparatus which executes image processing of determining a comparison region used to perform similarity comparison between a comparison source image and a comparison destination image, comprising:

a histogram calculation step of calculating horizontal and vertical projection histograms of an image to be processed;

an object size calculation step of calculating autocorrelation values of the horizontal and vertical projection histograms which are calculated in the histogram calculation step, and calculating horizontal and vertical object sizes until the autocorrelation values decrease to predetermined thresholds;

an aspect ratio estimate value calculation step of calculating an aspect ratio estimate value of a circumscribed rectangle of an object serving as a comparison region candidate in the image to be processed on the basis of calculation results of the object size calculation step; and a comparison region determination step of correcting the comparison region candidate on the basis of the aspect ratio estimate value calculated in the aspect ratio estimate value calculation step, and determining a final comparison region.

According to the present invention the foregoing object is attained by providing a method of controlling an image processing apparatus which executes image processing of determining a comparison region used to perform similarity comparison between a comparison source image and a comparison destination image, comprising:

a calculation step of calculating projection histograms of the comparison source image and the comparison destination image;

a comparison region candidate determination step of determining comparison region candidates used to perform similarity comparison between the comparison source image and the comparison destination image on the basis of the projection histograms calculated in the calculation step; and a comparison region determination step of determining a final comparison region by correcting the comparison region candidates on the basis of at least one of aspect ratio estimate values of circumscribed rectangles of objects serving as comparison region candidates in the comparison source image and the comparison destination image that are calculated on the basis of the projection histograms calculated in the calculation step, and a homothetic ratio estimate value of the circumscribed rectangles of the objects serving as the comparison region candidates in the comparison source image and the comparison destination image.

According to the present invention, the foregoing object is attained by providing program for causing a computer to control an image processing apparatus which executes image processing of determining a comparison region used to perform similarity comparison between a comparison source image and a comparison destination image, characterized by causing the computer to execute a histogram calculation step of calculating horizontal and vertical projection histograms of an image to be processed, an object size calculation step of calculating autocorrelation values of the horizontal and vertical projection histograms which are calculated in the histogram calculation step, and calculating horizontal and vertical object sizes until the autocorrelation values decrease to predetermined thresholds, an aspect ratio estimate value calculation step of calculating an aspect ratio estimate value of a circumscribed rectangle of an object serving as a comparison region candidate in the image to be processed on the basis of calculation results of the object size calculation step, and a comparison region determination step of correcting the comparison region candidate on the basis of the aspect ratio estimate value calculated in the aspect ratio estimate value calculation step, and determining a final comparison region.

According to the present invention, the foregoing object is attained by providing program for causing a computer to control an image processing apparatus which executes image processing of determining a comparison region used to perform similarity comparison between a comparison source image and a comparison destination image, characterized by causing the computer to execute a calculation step of calculating projection histograms of the comparison source image and the comparison destination image, a comparison region candidate determination step of determining comparison region candidates used to perform similarity comparison between the comparison source image and the comparison destination image on the basis of the projection histograms calculated in the calculation step, and a comparison region determination step of determining a final comparison region by correcting the comparison region candidates on the basis of at least one of aspect ratio estimate values of circumscribed rectangles of objects serving as comparison region candidates in the comparison source image and the comparison destination image that are calculated on the basis of the projection histograms calculated in the calculation step, and a homothetic ratio estimate value of the circumscribed rectangles of the objects serving as the comparison region candidates in the comparison source image and the comparison destination image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 7 is a table for explaining caution to be exercised in block division according to the first embodiment of the present invention;

FIG. 9 is a view showing an example of a position shifting pattern according to the first embodiment of the present invention;

DETAILED DESCRIPTION OF THE PREFERRED EMBODIMENTS

Preferred embodiments of the present invention will be described in detail in accordance with the accompanying drawings.

First Embodiment

In the first embodiment, image data scanned in copying an original is stored in a storage device. Processing (comparison processing for details of image data) of searching image data scanned in copying an original having an annotation, stain, or the like for corresponding image data of the original is executed to output the searched image data. The first embodiment will be described by exemplifying this arrangement.

With this arrangement, an original free from any annotation or stain can be obtained as a copy of the original having an annotation or stain.

<Arrangement of Apparatus>

Figure 1:
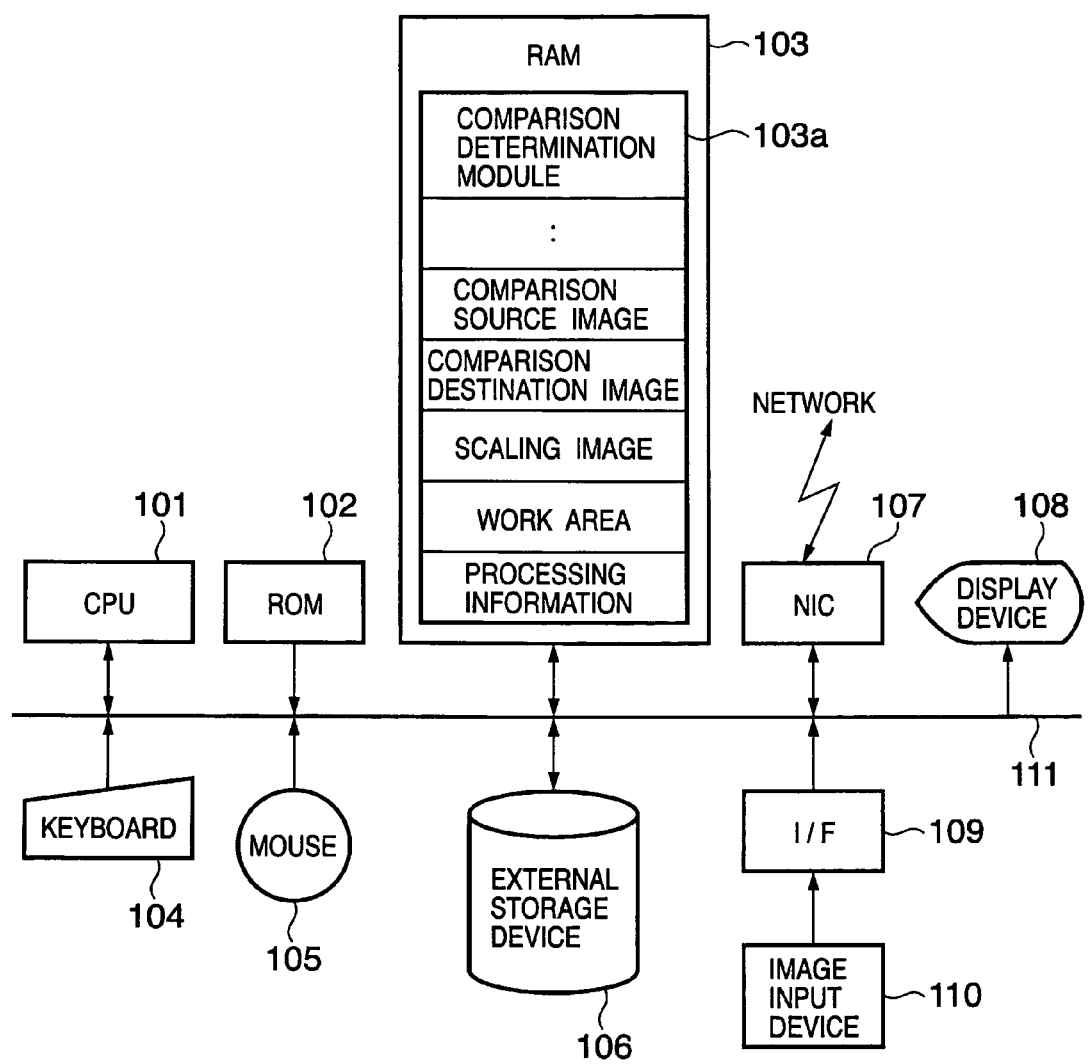
FIG. 1 is a view showing an example of the arrangement of an image processing apparatus according to the first embodiment of the present invention.

FIG. 1 is a view showing an example of the arrangement of an image processing apparatus according to the first embodiment of the present invention.

In FIG. 1, reference numeral 101 denotes a CPU which executes various arithmetic and control operations in image processing (or image search processing) according to the first embodiment. Reference numeral 102 denotes a ROM which stores various permanent data and a boot program executed at startup of the image processing apparatus.

Reference numeral 103 denotes a RAM which stores control programs to be processed by the CPU 101 and provides a work area used to execute various control operations by the CPU 101. For example, the RAM 103 stores, in its storage area, a comparison determination module 103a serving as a program for image processing of the present invention, a comparison source image, a comparison destination image, a scaling (enlarging/reducing) image, a work area for performing various processes, and processing information on processing (processing parameters, various counter values, thresholds, and the like).

Reference numeral 104 denotes a keyboard; and 105, a mouse which provides various input operation environments for, e.g., designating a processing mode by the user. Reference numeral 106 denotes an external storage device which is formed from a hard disk, floppy® disk, CD-ROM, and the like. Reference numeral 107 denotes a NIC (Network Interface Controller) which has a network interface and enables communication with devices on a network.

Reference numeral 108 denotes a display device which is formed from an LCD, CRT, or the like. Reference numeral 109 denotes an interface (I/F) for connecting an external device (e.g., an image input device 110). The image input device 110 is comprised of an image scanner, digital camera, and the like. Reference numeral 111 denotes a bus which interconnects various building components of the image processing apparatus.

A comparison source image and comparison destination image may be stored in the external storage device 106 other than the RAM 103. Alternatively, the comparison source image and comparison destination image may be acquired from an external device or the image input device 110 on a network.

An outline of processing by the image processing apparatus according to the first embodiment will be explained with reference to FIG. 2.

Figure 2:
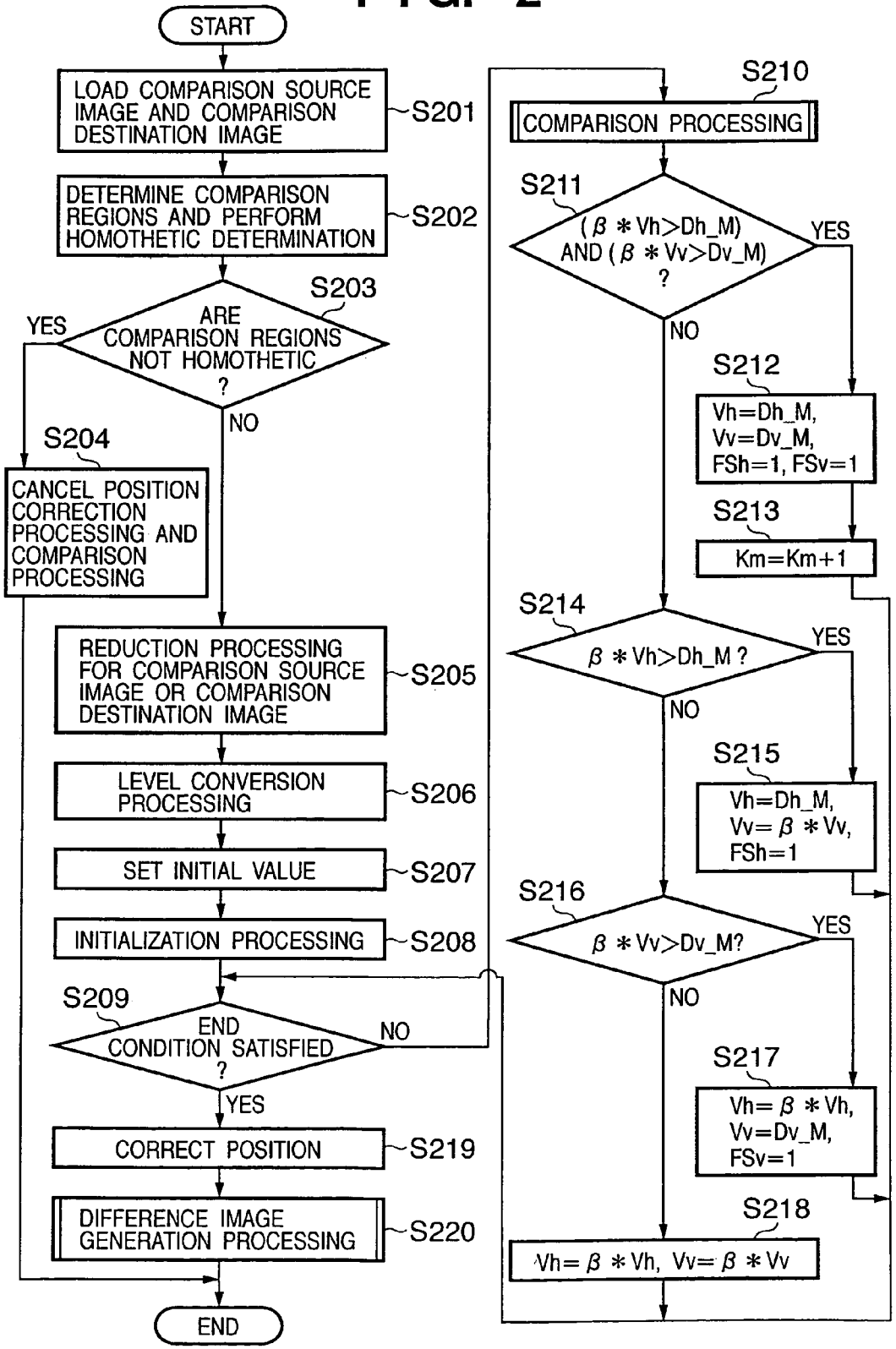
FIG. 2 is a flowchart showing an outline of processing by the image processing apparatus according to the first embodiment of the present invention.

FIG. 2 is a flowchart showing an outline of processing by the image processing apparatus according to the first embodiment of the present invention.

In step S201, a comparison source image and comparison destination image are loaded from an image input source (e.g., the external storage device 106 or image input device 110) into a memory (e.g., the RAM 103).

In step S202, a provisional comparison source region and comparison destination region are determined as the comparison region candidates of the comparison source image and the comparison destination image. The provisional comparison region may be determined manually by the user or automatically by the image processing apparatus. In addition, in step S202, homothetic determination of whether the comparison source image and comparison destination image are homothetic is executed.

As will be described in detail below, when the provisional comparison region (comparison region candidate) is automatically determined, histograms are created by projecting the brightness values of the comparison source image and comparison destination image in the horizontal and vertical directions. The circumscribed rectangle of an object to be compared is acquired from the distribution of brightness histograms. The brightness histograms undergo threshold processing, and histogram intervals (object sizes) at which the brightness value is equal to or larger than the threshold are determined in the horizontal and vertical directions, acquiring the circumscribed rectangle of the object. In the first embodiment, a rectangular region defined by the circumscribed rectangle is determined as a comparison region candidate (comparison range).

Details of processing in step S202 will be explained with reference to FIG. 3.

Figure 3:
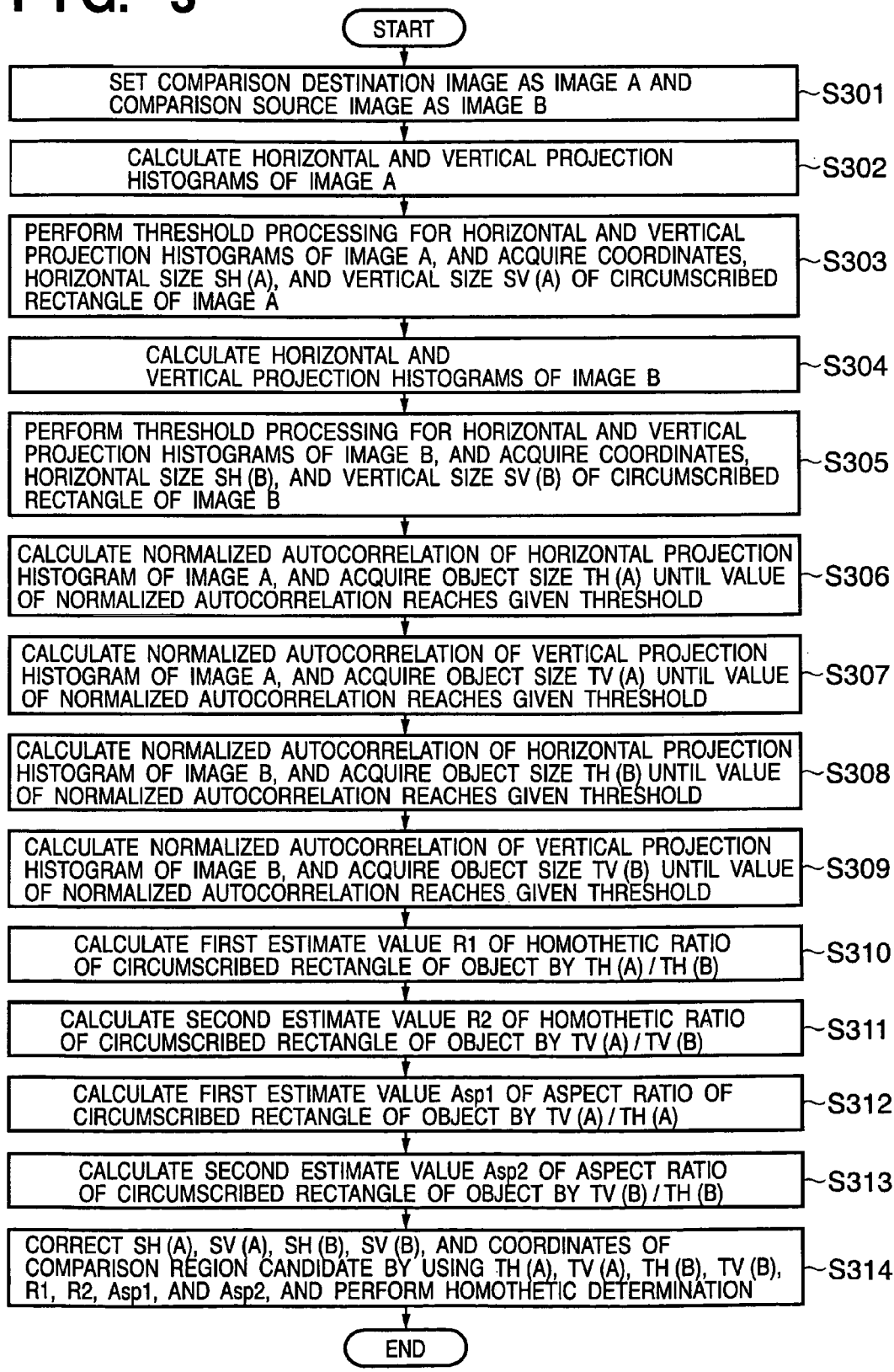
FIG. 3 is a flowchart showing details of processing in step S202 according to the first embodiment of the present invention.

FIG. 3 is a flowchart showing details of processing in step S202 according to the first embodiment of the present invention.

In step S301, a comparison destination image serving as an object is set as an image A, and a comparison source image serving as an object is set as an image B.

As described above, image data scanned in copying an original is stored in a storage device. Processing (comparison processing for details of image data) of searching image data scanned in copying an original having an annotation, stain, or the like for corresponding image data of the original is executed to output the searched image data. When this arrangement is assumed, the image A serving as a comparison destination image is stored image data (original image data), and the image B serving as a comparison source image is image data scanned in copying an original having an annotation, stain, or the like.

Figure 4:
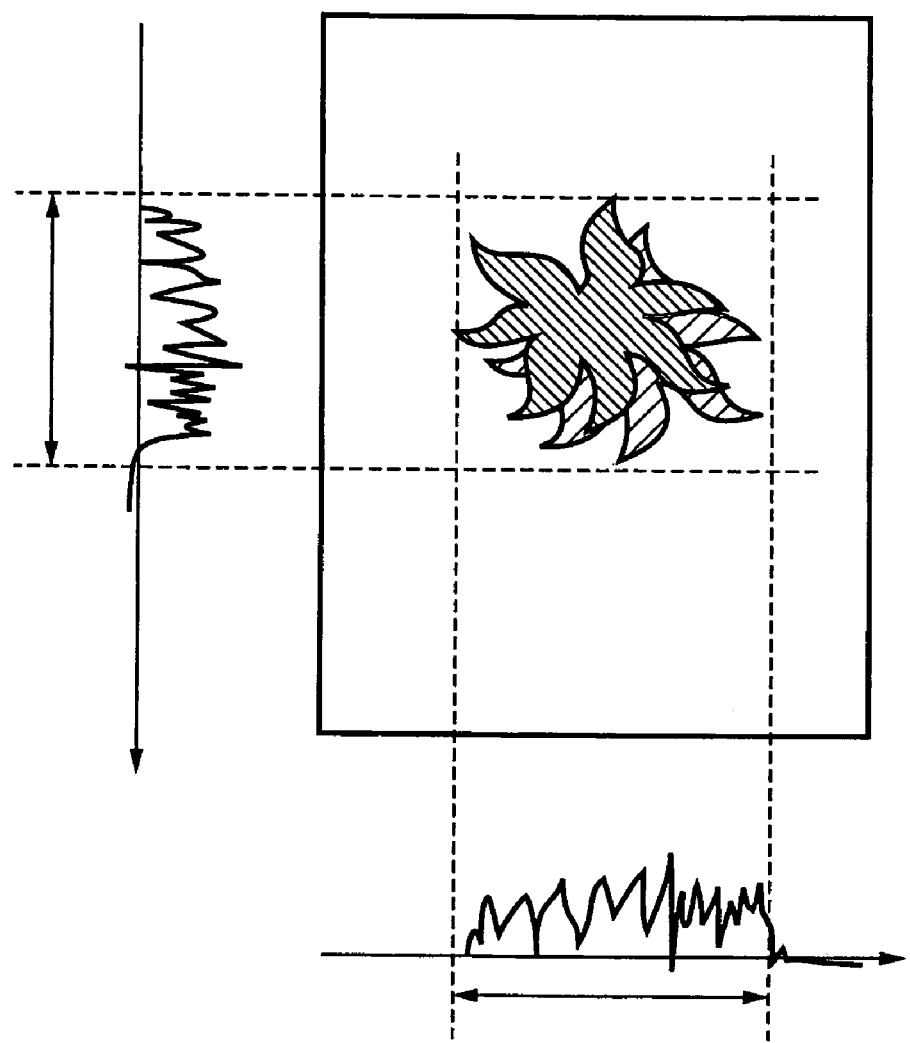
FIG. 4 is a view for explaining a comparison region determination method according to the first embodiment of the present invention.

In step S302, the horizontal and vertical projection histograms of the image A are calculated. In step S303, as shown in FIG. 4, the horizontal and vertical projection histograms of the image A serving as an image to be processed undergo threshold processing to acquire the coordinates, horizontal size SH(A), and vertical size SV(A) of the circumscribed rectangle of the image A.

Similarly in step S304, the horizontal and vertical projection histograms of the image B are calculated. In step S305, as shown in FIG. 4, the horizontal and vertical projection histograms of the image B serving as an image to be processed undergo threshold processing to acquire the coordinates, horizontal size SH(B), and vertical size SV(B) of the circumscribed rectangle of the image B.

Figure 5:
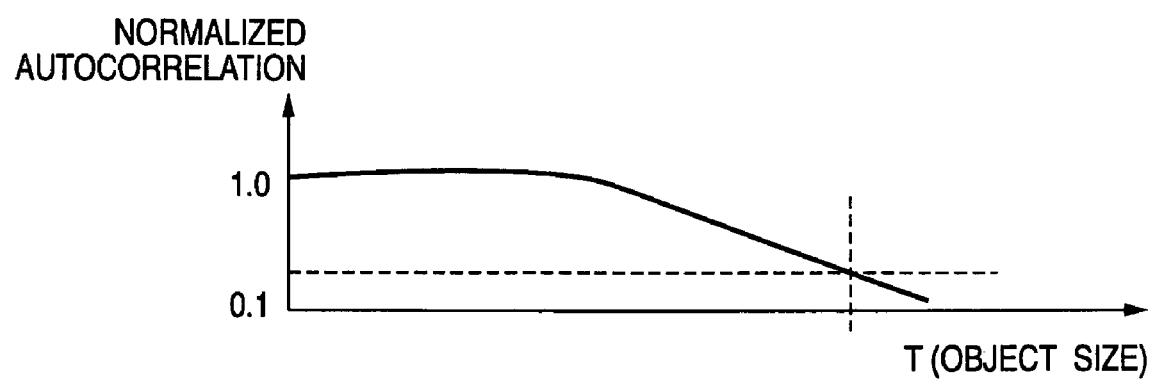
FIG. 5 is a graph for explaining object size determination based on the normalized autocorrelation of the projection histogram according to the first embodiment of the present invention.

In step S306, as shown in FIG. 5, the normalized autocorrelation of the horizontal projection histogram of the image A is calculated to acquire an object size TH(A) until the value of the normalized autocorrelation reaches a given threshold (object size threshold).

It is experimentally known that the object size threshold preferably has a value of about 0.1 to 0.2 in consideration of the influence of an annotation, stain, or the like on a read original.

The object size threshold is an observation amount free from the influence of an object position in an image, and acts to relax the influence of an annotation, stain, or the like on the projection histogram. Since the projection histogram is evaluated after the normalized autocorrelation decreases to a given threshold, the projection histogram is less influenced by an annotation, stain, or the like.

In step S307, the normalized autocorrelation of the vertical projection histogram of the image A is calculated to acquire an object size TV(A) until the value of the normalized autocorrelation reaches a given threshold.

In step S308, the normalized autocorrelation of the horizontal projection histogram of the image B is calculated to acquire an object size TH(B) until the value of the normalized autocorrelation reaches a given threshold. In step S309, the normalized autocorrelation of the vertical projection histogram of the image B is calculated to acquire an object size TV(B) until the value of the normalized autocorrelation reaches a given threshold.

In step S310, a first estimate value R1 of the horizontal homothetic ratio of the circumscribed rectangle of an object serving as a comparison region candidate is calculated by $$R1 = TH(A)/TH(B) \quad (1)$$

In step S311, a second estimate value R2 of the vertical homothetic ratio of the circumscribed rectangle of the object serving as a comparison region candidate is calculated by $$R2 = TV(A)/TV(B) \quad (2)$$

In step S312, a first estimate value Asp1 of the aspect ratio of the circumscribed rectangle (image A) of the object serving as a comparison region candidate is calculated by $$Asp1 = TV(A)/TH(A) \quad (3)$$

In step S313, a second estimate value Asp2 of the aspect ratio of the circumscribed rectangle (image B) of the object serving as a comparison region candidate is calculated by $$Asp2 = TV(B)/TH(B) \quad (4)$$

In step S314, SH(A), SV(A), SH(B), SV(B), and the coordinates of the comparison region candidate are corrected using TH(A), TV(A), TH(B), TV(B), R1, R2, Asp1, and Asp2. Further, homothetic determination of whether the images A and B are homothetic is executed.

Various parameters TH(A), TV(A), TH(B), TV(B), R1, R2, Asp1, Asp2, SH(A), SV(A), SH(B), and SV(B) which are obtained by processing in FIG. 3 are stored in the memory (e.g., the RAM 103).

Details of step S314 will be described with reference to FIGS. 6A and 6B.

Figure 6A:
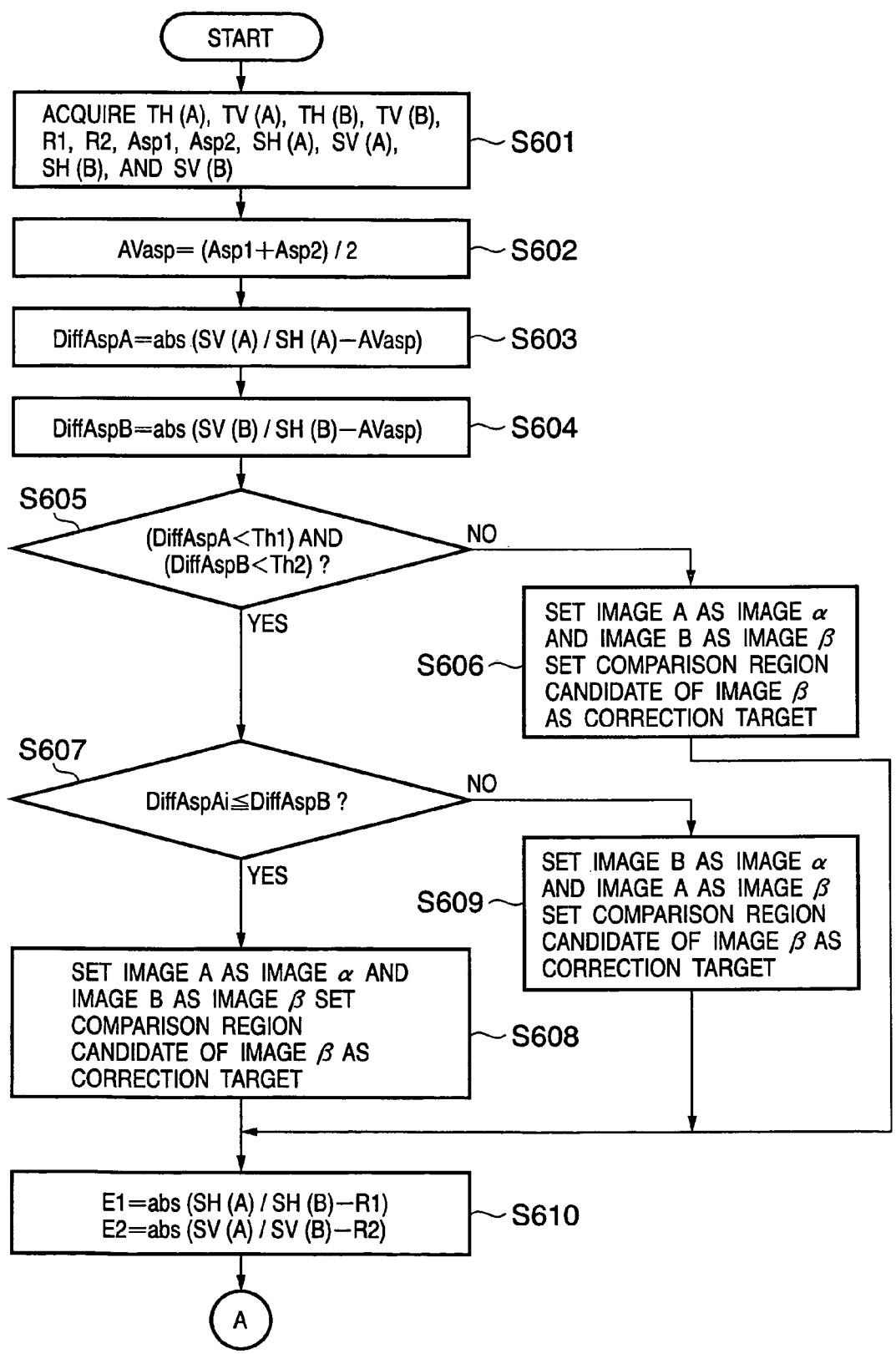
FIG. 6A is a flowchart showing details of processing in step S314 according to the first embodiment of the present invention.
Figure 6B:
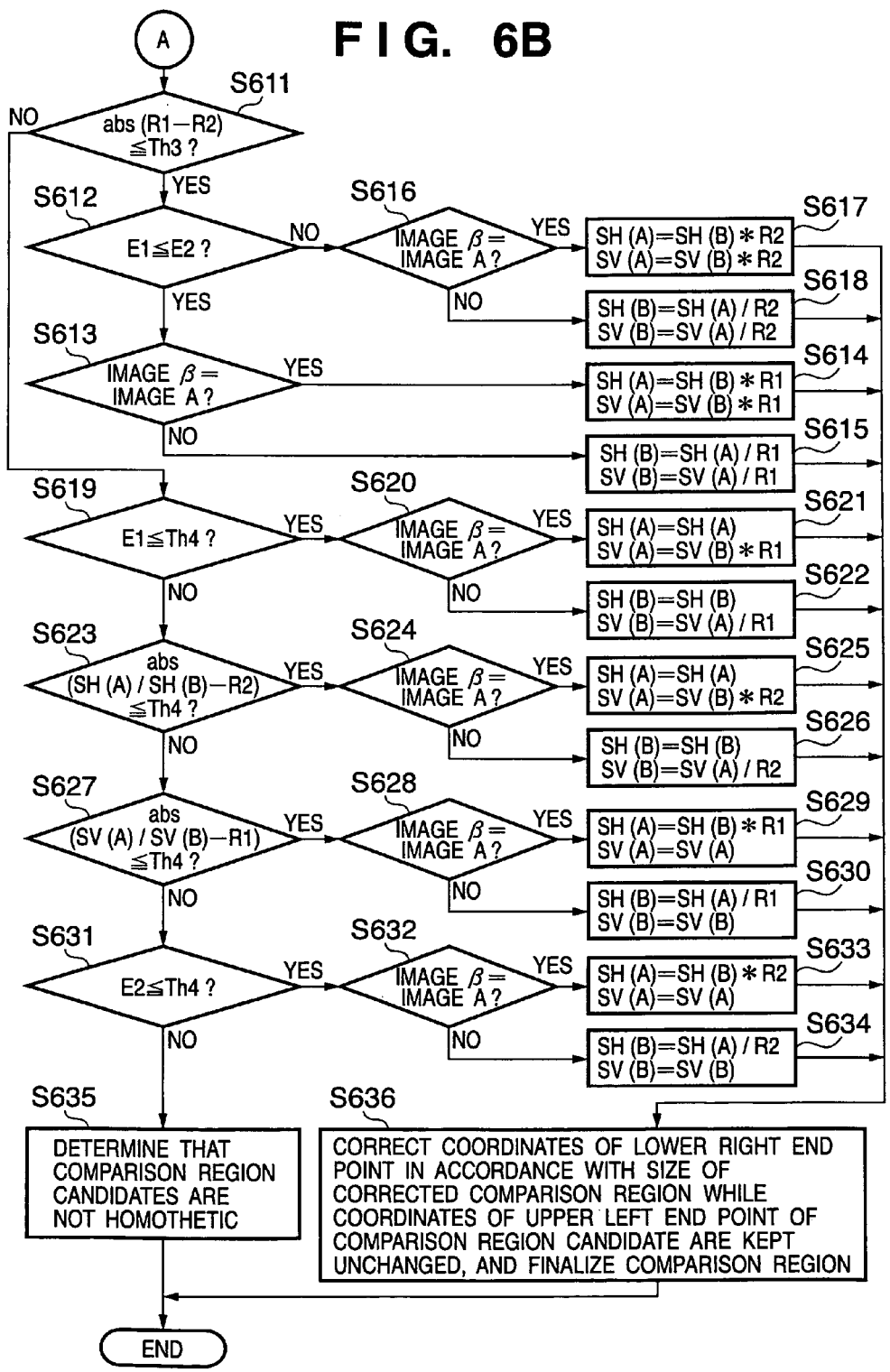
FIG. 6B is a flowchart showing details of processing in step S314 according to the first embodiment of the present invention.

FIGS. 6A and 6B are flowcharts showing details of processing in step S314 according to the first embodiment of the present invention.

In step S601, various parameters TH(A), TV(A), TH(B), TV(B), R1, R2, Asp1, Asp2, SH(A), SV(A), SH(B), and SV(B) which are stored in the memory by processing in FIG. 3 are acquired.

In step S602, an average AVasp of the aspect ratios of the two, comparison destination image (image A) and comparison source image (image B) that have been calculated from the object size thresholds based on the normalized autocorrelations is calculated by $$AVasp = (Asp1 + Asp2)/2 \quad (5)$$

In step S603, an absolute value DiffaspA of a difference from the aspect ratio obtained from the comparison region candidate extraction result of the image A is calculated by $$DiffaspA = abs(SV(A)/SH(A) - AVasp) \quad (6)$$

In step S604, an absolute value DiffaspB of a difference from the aspect ratio obtained from the comparison region candidate extraction result of the image B is calculated by $$DiffaspB = abs(SV(B)/SH(B) - AVasp) \quad (7)$$

Processes in the following steps S605 to S609 determine which of the images A and B has a more reliable comparison region candidate extraction result based on the projection histogram.

In step S605, it is determined whether DiffaspA is smaller than a threshold Th1 and DiffaspB is smaller than a threshold Th2. If DiffaspA is equal to or larger than the threshold Th1 and DiffaspB is equal to or larger than the threshold Th2 (NO in step S605), neither the comparison region candidate extraction result of the image A nor the comparison region candidate extraction result of the image B is satisfactorily reliable. Thus, in step S606, an image α which can be expected to have an empirically likely result is set as the image A, and an image β which can be expected to have an inferior result is set as the image B. In addition, the comparison region candidate of the image β, i.e., image B is set as a correction target.

In step S301, the image A serving as a comparison destination image is stored image data, and the image B serving as a comparison source image is image data scanned in copying an original having an annotation, stain, or the like. This is based on a rational empirical rule.

If DiffaspA is smaller than the threshold Th1 or DiffaspB is smaller than the threshold Th2 in step S605 (YES in step S605), it is determined in step S607 whether DiffaspA≦DiffaspB. If DiffaspA≦DiffaspB (YES in step S607), it is determined that the comparison region candidate extraction result of the image A is more accurate. In step S608, the image A is set as the image α, the image B is set as the image β, and the comparison region candidate of the image β is set as a correction target.

If DiffaspA>DiffaspB (NO in step S607), it is determined that the comparison region candidate extraction result of the image B is more accurate. In step S609, the image B is set as the image α, the image A is set as the image β, and the comparison region candidate of the image β is set as a correction target.

In step S610, E1 and E2 are calculated by $$E1=abs(SH(A)/SH(B)-R1) \quad (8)$$

$$E2=abs(SV(A)/SV(B)-R2) \quad (9)$$

E1: total likelihood of horizontal processing
E2: total likelihood of vertical processing Referring to FIG. 6B, in step S611, it is determined using a threshold Th3 whether abs(R1−R2)≦Th3. If abs(R1−R2)≦Th3 (YES in step S611), it is determined that estimation of the homothetic ratio on the basis of the object size of the normalized autocorrelation is very successful in both the horizontal and vertical directions. In step S612, whether E1≦E2 is determined.

If E1>E2 (NO in step S612), it is determined that vertical processing is more accurate. The size of the comparison region candidate is corrected using the vertical homothetic ratio R2. At this time, in step S616, it is determined whether the image β is the image A, i.e., the image to be corrected is the image A.

If the image β is the image A in step S616 (YES in step S616), the image is corrected by the following correction equations using the size of the comparison region candidate of the image B and the vertical homothetic ratio R2 in step S617. After that, the flow advances to step S636.

$$SH(A)=SH(B)*R2 \quad (10)$$

$$SV(A)=SV(B)*R2 \quad (11)$$

If the image β is not the image A in step S616 (NO in step S616), it is determined that the image to be corrected is the image B. The image is corrected by the following correction equations using the size of the comparison region candidate of the image A and the vertical homothetic ratio R2. Then, the flow advances to step S636.

$$SH(B)=SH(A)/R2 \quad (12)$$

$$SV(B)=SV(A)/R2 \quad (13)$$

If E1≦E2 in step S612 (YES in step S612), it is determined that horizontal processing is more accurate. The size of the comparison region candidate is corrected using the horizontal homothetic ratio R1. At this time, in step S613, it is determined whether the image β is the image A, i.e., the image to be corrected is the image A.

If the image β is the image A in step S613 (YES in step S613), the image is corrected by the following correction equations using the size of the comparison region candidate of the image B and the horizontal homothetic ratio R1 in step S614. Thereafter, the flow advances to step S636.

$$SH(A)=SH(B)*R1 \quad (14)$$

$$SV(A)=SV(B)*R1 \quad (15)$$

If the image β is not the image A in step S613 (NO in step S613), it is determined that the image to be corrected is the image B. The image is corrected by the following correction equations using the size of the comparison region candidate of the image A and the horizontal homothetic ratio R1. Then, the flow advances to step S636.

$$SH(B)=SH(A)/R1 \quad (16)$$

$$SV(B)=SV(A)/R1 \quad (17)$$

If abs(R1−R2)>Th3 in step S611 (NO in step S611), it is determined that estimation of the homothetic ratio on the basis of the object size of the normalized autocorrelation is not successful in both the horizontal and vertical directions. Hence, it is determined which of estimation of the horizontal homothetic ratio and estimation of the vertical homothetic ratio is more successful. The size of the comparison region candidate in a direction in which estimation of the homothetic ratio is less successful is corrected.

For this purpose, in step S619, it is determined whether E1≦Th4, i.e., abs(SH(A)/SH(B)−R1)≦Th4. If E1≦Th4 (YES in step S619), the flow advances to step S620. In this case, it can be estimated that estimation of the horizontal homothetic ratio and the horizontal processing result of extracting the comparison region candidate are accurate.

In step S620, it is determined whether the image β is the image A, i.e., the image to be corrected is the image A. If the image β is the image A (YES in step S620), the image is corrected in only the vertical direction by the following correction equations using the size of the comparison region candidate of the image B and the horizontal homothetic ratio R1 in step S621. After that, the flow advances to step S636.

$$SH(A)=SH(A) \quad (18)$$

$$SV(A)=SV(B)*R1 \quad (19)$$

If it is determined in step S620 that the image β is not the image A (NO in step S620), it is determined that the image to be corrected is the image B. The image is corrected in only the vertical direction by the following correction equations using the size of the comparison region candidate of the image A and the horizontal homothetic ratio R1. Then, the flow advances to step S636.

$$SH(B)=SH(B) \quad (20)$$

$$SV(B)=SV(A)/R1 \quad (21)$$

If E1>Th4 in step S619 (NO in step S619), it is determined in step S623 whether abs(SH(A)/SH(B)−R2)≦Th4. If abs(SH(A)/SH(B)−R2)≦Th4 (YES in step S623), the flow advances to step S624. In this case, it can be estimated that estimation of the vertical homothetic ratio and the horizontal processing result of extracting the comparison region candidate are accurate.

In step S624, it is determined whether the image β is the image A, i.e., the image to be corrected is the image A. If the image β is the image A (YES in step S624), the image is corrected in only the vertical direction by the following correction equations using the size of the comparison region candidate of the image B and the vertical homothetic ratio R2 in step S625. Thereafter, the flow advances to step S636.

$$SH(A)=SH(A) \quad (22)$$

$$SV(A)=SV(B)*R2 \quad (23)$$

If the image β is not the image A in step S624 (NO in step S624), it is determined in step S626 that the image to be corrected is the image B. The image is corrected in only the vertical direction by the following correction equations using the size of the comparison region candidate of the image A and the vertical homothetic ratio R2. Then, the flow advances to step S636.

$$SH(B)=SH(B) \quad (24)$$

$$SV(B)=SV(A)/R2 \quad (25)$$

If abs(SH(A)/SH(B)−R2)>Th4 in step S623 (NO in step S623), it is determined in step S627 whether abs(SV(A)/SV(B)−R1)≦Th4. If abs(SV(A)/SV(B)−R1)≦Th4 (YES in step S627), the flow advances to step S628. In this case, it can be estimated that estimation of the horizontal homothetic ratio and the vertical processing result of extracting the comparison region candidate are accurate.

In step S628, it is determined whether the image β is the image A, i.e., the image to be corrected is the image A. If the image β is the image A (YES in step S628), the image is corrected in only the horizontal direction by the following correction equations using the size of the comparison region candidate of the image B and the horizontal homothetic ratio R1 in step S629. Thereafter, the flow advances to step S636.

$$SH(A)=SH(B)*R1 \quad (26)$$

$$SV(A)=SV(A) \quad (27)$$

If the image β is not the image A in step S628 (NO in step S628), it is determined in step S630 that the image to be corrected is the image B. The image is corrected in only the horizontal direction by the following correction equations using the size of the comparison region candidate of the image A and the horizontal homothetic ratio R1. Then, the flow advances to step S636.

$$SH(B)=SH(A)/R1 \quad (28)$$

$$SV(B)=SV(B) \quad (29)$$

If abs(SV(A)/SV(B)−R1)>Th4 in step S627 (NO in step S627), it is determined in step S631 whether E2≦Th4, i.e., abs (SV(A)/SV(B)−R2)≦Th4. If E2≦Th4 (YES in step S631), the flow advances to step S632. In this case, it can be estimated that estimation of the vertical homothetic ratio and the vertical processing result of extracting the comparison region candidate are accurate.

In step S632, it is determined whether the image β is the image A, i.e., the image to be corrected is the image A. If the image β is the image A (YES in step S632), the image is corrected in only the horizontal direction by the following correction equations using the size of the comparison region candidate of the image B and the vertical homothetic ratio R2 in step S633. Thereafter, the flow advances to step S636.

$$SH(A)=SH(B)*R2 \quad (30)$$

$$SV(A)=SV(A) \quad (31)$$

If the image β is not the image A in step S632 (NO in step S632), it is determined in step S634 that the image to be corrected is the image B. The image is corrected in only the horizontal direction by the following correction equations using the size of the comparison region candidate of the image A and the vertical homothetic ratio R2. Then, the flow advances to step S636.

$$SH(B)=SH(A)/R2 \quad (32)$$

$$SV(B)=SV(B) \quad (33)$$

If E2>Th4 in step S631 (NO in step S631), all analysis results do not exhibit any homothetic ground. It is, therefore, determined that the comparison region candidates of the comparison source image and comparison destination image are not homothetic, ending correction processing.

In step S636, it is determined that the images A and B are homothetic. The coordinates of the lower right end point of the comparison region candidate are corrected in accordance with the size of the corrected comparison region candidate while those of the upper left end point are kept unchanged, finalizing a final comparison region.

Referring back to FIG. 2, whether the comparison source image and comparison destination image are homothetic is determined in step S203 on the basis of the processing result of step S202. If the comparison source image and comparison destination image are not homothetic (YES in step S203), position correction processing and comparison processing are canceled in step S204, and the processing ends.

If it is determined in step S203 that the comparison source image and comparison destination image are homothetic (NO in step S203), the homothetic ratio of the comparison source image and comparison destination image is calculated in step S205. If the comparison source image is larger on the basis of the homothetic ratio, it is reduced to generate a new comparison source image. Coordinate information of the comparison region is also corrected in accordance with reduction processing.

If the comparison destination image is larger, it is reduced to generate a new comparison destination image. Coordinate information of the comparison region is also corrected in accordance with reduction processing.

Processing of strictly matching the sizes of the comparison regions of the comparison source image and comparison destination image is very important. This is because in block division of the comparison region (to be described later), the comparison region is divided into blocks for longitudinal and lateral grids. If the size of the comparison region is different between the comparison source image and the comparison destination image, the remainder which remains when the longitudinal and lateral dimensions are divided by a block division count to attain the size of one block changes.

FIG. 7 shows an example of the remainder when the homothetic ratio of the comparison regions of the comparison source image and comparison destination image is 1:2. Since the remainder values of the comparison source image and comparison destination image are different, the remainder cannot be assigned to the blocks of the comparison source image and the comparison destination image under the same condition. This adversely affects the precision of processing of calculating a correction position.

Hence, by reducing the comparison source image and comparison destination image to the same size, the same remainder can be obtained from the comparison destination image and comparison source image, which can then be treated under the same condition. Adverse influence of the remainder upon block division can be avoided.

By reduction processing, the sizes of the comparison regions of the comparison source image and comparison destination image become equal to each other. As for the size of the comparison region, the lateral dimension (number of lateral pixels) is represented by ImgH, and the longitudinal dimension (number of longitudinal pixels) of the comparison region is represented by ImgV.

In step S206, level conversion processing of adjusting the feature amount levels (the numbers of colors and the numbers of gray levels) of the comparison images to the lower feature amount level of the two images is executed.

More specifically, when both comparison images (comparison source image and comparison destination image) are color images, grayscale images, or binary images, no conversion is done.

Alternatively, when comparison images are a color image and grayscale image, the color image is converted into a grayscale image. Alternatively, if one of the comparison images is a binary image, the other is converted into a binary image.

With this processing, the feature amount levels (number of colors and number of gray levels) of the comparison images can be adjusted to the lower feature amount level of the two images.

In step S207, the initial value of comparison processing is set.

More specifically, an upper limit horizontal block division count Dh_M which is smaller than the lateral pixel count ImgH of the comparison region is set. An upper limit vertical block division count Dv_M which is smaller than the longitudinal pixel count ImgV of the comparison region is set.

Initial block division counts (Vh and Vv) in the horizontal and vertical directions are set to values much smaller than the numbers of lateral and longitudinal pixels of the comparison region. If the initial counts are too small, the count of recursive processing (to be described later) using the initial block division counts increases, and the processing time becomes long. To the contrary, if the initial counts are too large and the position shifting amount does not fall within the range of one block prepared by dividing the comparison region, position shifting correction processing may not converge in principle.

It is, therefore, preferable to predict the precision of the comparison region and set an initial block division count so that an error sufficiently falls within the block size.

A block division count used for the next comparison processing is set by multiplying the current block division count by the second constant β, and is updated to a position correction value of a higher precision every time processing is repeated. The second constant β is set to the range of 1.0 (exclusive) to about 2.0 (maximum), and preferably to 2.0.

As the second constant β is smaller, convergence of position correction processing is more assured. In this case, however, the count of recursive processing increases, and processing takes a long time. Thus, a desired value is set in accordance with an application purpose.

In step S208, initialization processing is executed.

More specifically, position correction amounts (Cx and Cy) in the X (lateral) and Y (longitudinal) directions are initialized to 0. A counter Km for comparison processing using the numbers of longitudinal and lateral pixels of the comparison region as longitudinal and lateral block division counts is also initialized to 0. Flags FSh and FSv representing that the block division counts (Vh and Vv) have respectively reached upper limit block division counts (Dh_M and Dv_M) are also initialized to 0.

In step S209, it is determined whether recursive processing end conditions in steps S210 to S218 are satisfied. The end conditions are used to control the recursive processing count, and will be described in detail later. If the end conditions are satisfied (YES in step S209), the flow advances to step S219. If the end conditions are not satisfied (NO in step S209), the flow advances to step S210.

In step S210, the position correction amounts (Cx and Cy) and block division counts (Vh and Vv) are designated, and comparison processing is performed using a plurality of types of block shifting patterns. Position correction amounts (Cx and Cy) and a minimum similarity distance Dmin used for the next comparison processing are calculated.

Details of comparison processing in step S210 will be explained with reference to FIG. 8.

Figure 8:
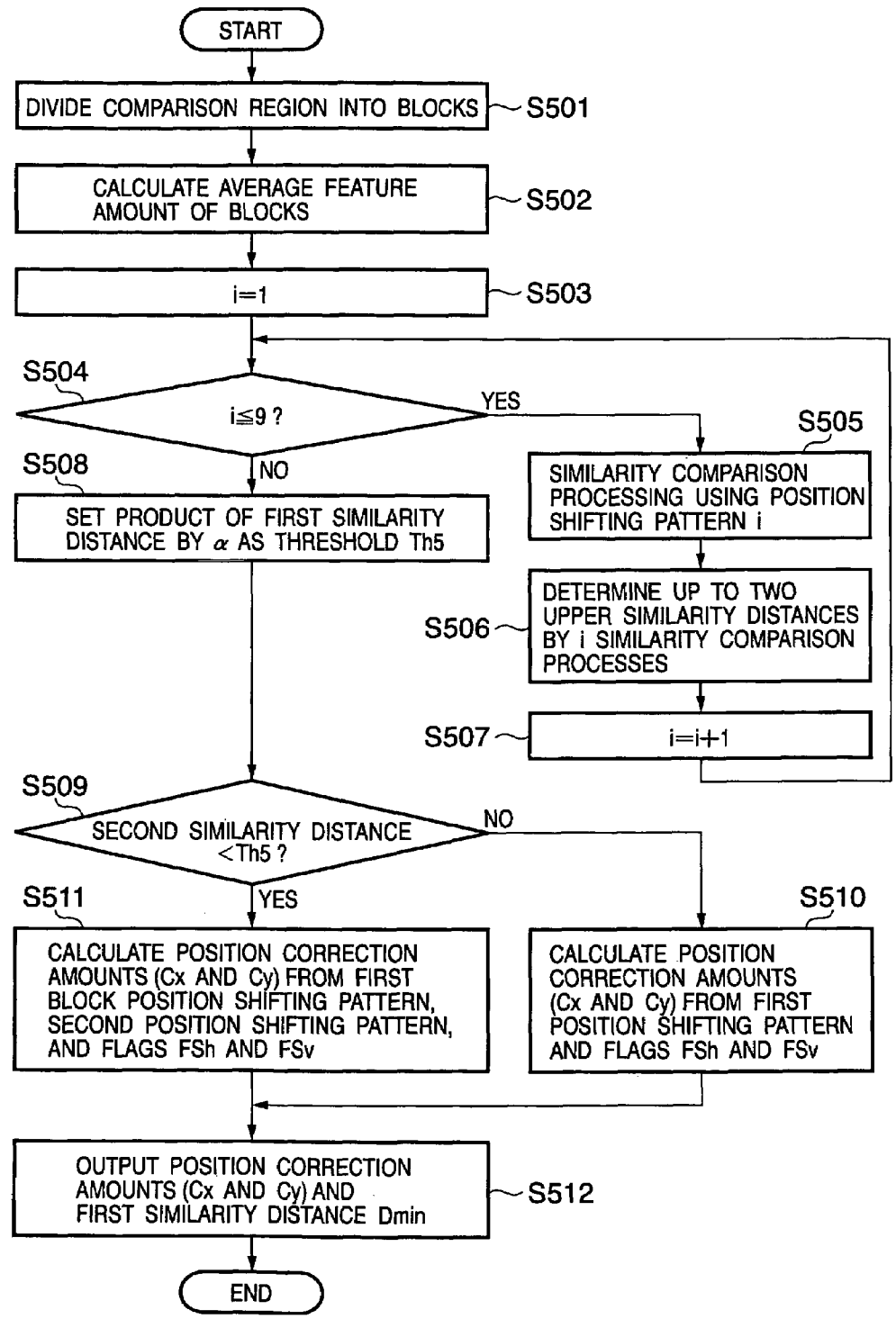
FIG. 8 is a flowchart showing details of comparison processing according to the first embodiment of the present invention.

FIG. 8 is a flowchart showing details of comparison processing according to the first embodiment of the present invention.

In step S501, the position of the comparison region of a comparison source image is corrected by designated position correction amounts (Cx and Cy), and the comparison region is divided into blocks by designated block division counts (Vh and Vv). The comparison region of a comparison destination image is also divided into blocks by the designated block division counts (Vh and Vv).

An image to which the position correction amounts (Cx and Cy) are applied may be a comparison source image or comparison destination image. The first embodiment will exemplify a case wherein the position correction amounts (Cx and Cy) are applied to position correction of a comparison source image.

In step S502, the average feature amount of blocks in the divided comparison region is calculated.

In calculation, when both the comparison images are color images, the average of color channels in each color image is calculated as an average feature amount. When the comparison images are a color image and grayscale image or both of them are grayscale images, the average brightness of each image is calculated as an average feature amount. When one of the comparison images is a binary image, a value which is a majority in each binary block is defined as an average feature amount.

Accordingly, even if the types of two images are different, average feature amounts are calculated for a feature with a smaller information amount of the two images, and compared.

In step S503, a counter i representing a position shifting pattern i is initialized to 1. In step S504, it is determined whether the value of the counter i is equal to or smaller than 9. If the value of the counter i is equal to or smaller than 9 (YES in step S504), the flow advances to step S505. If the value of the counter i is larger than 9 (NO in step S504), the flow advances to step S508.

Step S504 determines whether similarity comparison processing using each of position shifting patterns prepared in advance has been completed. In particular, the first embodiment adopts nine position shifting patterns (nine directions), but the present invention is not limited to this and can adopt an arbitrary number of position shifting patterns (e.g., five directions).

An example of the position shifting pattern will be explained with reference to FIG. 9.

FIG. 9 is a view showing an example of the position shifting pattern according to the first embodiment of the present invention.

FIG. 9 illustrates nine position shifting patterns. In FIG. 9, position shifting patterns 1 to 9 are selected in accordance with the value of the counter i.

In FIG. 9, a position shifting direction (position correction amount) on each position shifting pattern is given by a unit vector V(i)=(xi,yi). The unit vector originally represents a vector of magnitude 1. In this case, unit vectors V(6) to V(9) of position shifting patterns 6 to 9 are unit vectors ($\sqrt{2}$) which are synthesized using unit vectors V(2) to V(5) of position shifting patterns 2 to 5 and do not have magnitude 1. However, for descriptive convenience, the term "unit vector" will also be used for position shifting patterns 6 to 9.

Figure 10:
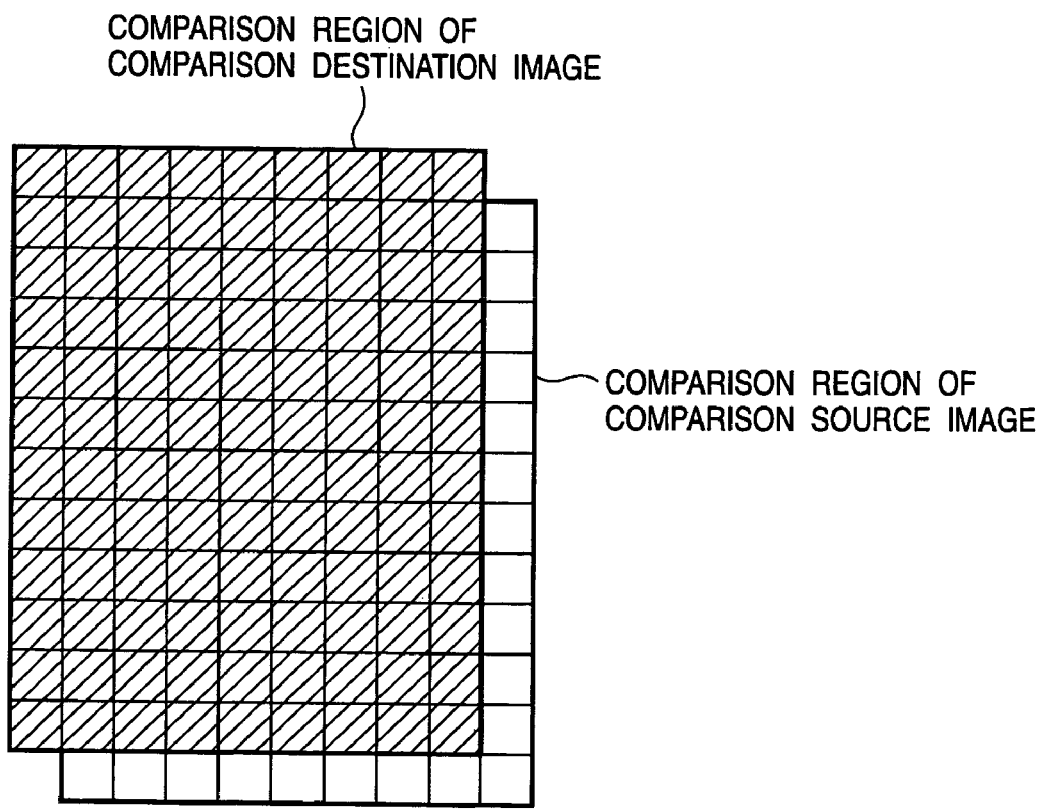
FIG. 10 is a view showing an example of position shifting according to the first embodiment of the present invention.

In FIG. 9, for example, position shifting pattern 1 has a position correction amount V(1)=(0,0). That is, substantially no position shifting occurs in the X and Y directions. For example, position shifting pattern 9 has a position correction amount V(9)=(1,−1). In this case, the position of the comparison region is shifted by "1" in the X direction and "−1" in the Y direction. More specifically, the position of the comparison region of a comparison source image is shifted, as shown in FIG. 10.

Referring back to FIG. 8, in step S505, similarity comparison processing is performed using the position shifting pattern i to be processed.

More specifically, the absolute value of the difference in feature amount between the overlapping portions of the comparison source image and comparison destination image after position shifting of the comparison region of the comparison source image on the basis of the position shifting pattern i is calculated for each block, and the absolute values of the differences of blocks are added.

The sum is divided by the number of blocks at the overlapping portion, and an average difference Diff(i) per block is calculated as a similarity distance (similarity). In step S506, two upper smallest similarity distances (similarities), i.e., two upper smallest average differences Diff(i) per block in i similarity comparison processes are determined. The similarity distance represents the average difference Diff(i), and the similarity is higher as the similarity distance is smaller. In other words, the smallest similarity distance corresponds to the highest similarity.

In step S507, the counter i is incremented by one, and the flow returns to step S504 in order to select the next position shifting pattern. In step S504, if the value of the counter i is larger than 9 (NO in step S504), i.e., all the position shifting patterns have been selected and similarity comparison processing using each position shifting pattern has ended, the flow advances to step S508.

In step S508, the smallest (first) similarity distance among similarity distances determined by processing in step S506 is multiplied by the first constant α. The product is set as a threshold Th5 for determining whether to enable a position shifting pattern corresponding to the second similarity distance.

From the experiments conducted by the present inventor, the constant α is preferably about 1.2.

In step S509, it is determined whether the second similarity distance is smaller than the threshold Th5. If the second similarity distance is equal to or larger than the threshold Th5 (NO in step S509), the position correction amounts (Cx and Cy) are calculated in step S510 from flags FSh and FSv and the first position shifting pattern p1 corresponding to the smallest (first) similarity distance.

The position correction amounts (Cx and Cy) are calculated by $$
\begin{aligned}
&\text{If (FSh} \neq 1) \\
&\qquad Cx = \text{ImgH/Vh} * V(p1,x) \\
&\text{Else} \\
&\qquad Cx = V(p1,x) \\
&\text{If (FSv} \neq 1) \\
&\qquad Cy = \text{ImgV/Vv} * V(p1,y) \\
&\text{Else} \\
&\qquad Cy = V(p1,y)
\end{aligned} \tag{34}
$$

V(i,x): the x component of the unit vector V(i) of the position shifting pattern i V(i,y): the y component of the unit vector V(i) of the position shifting pattern i In conditional expression (34), the term ImgH/Vh means the lateral dimension (number of lateral pixels) of a divided block, and the term ImgV/Vv means the longitudinal dimension (number of longitudinal pixels) of the divided block. When the flags FSh and FSv are set (FSh=1 and FSv=1), both the horizontal and vertical block division counts have reached their upper limit block division counts. Hence, the horizontal and vertical components of the unit vector are kept used.

If the second similarity distance is smaller than the threshold Th5 in step S509 (YES in step S509), the position correction amounts (Cx and Cy) are calculated in step S511 from the flags FSh and FSv, the first position shifting pattern p1 corresponding to the smallest (first) similarity distance, and the second position shifting pattern p2 corresponding to the second smallest (second) similarity distance.

The position correction amounts (Cx and Cy) are calculated by $$
\begin{aligned}
&\text{If (FSh} \neq 1) \\
&\qquad Cx = \text{ImgH/Vh} * (V(p1,x) + V(p2,x))/2 \\
&\text{Else} \\
&\qquad Cx = (V(p1,x) + V(p2,x))/2 \\
&\text{If (FSv} \neq 1) \\
&\qquad Cy = \text{ImgV/Vv} * (V(p1,y) + V(p2,y))/2 \\
&\text{Else} \\
&\qquad Cy = (V(p1,y) + V(p2,y))/2
\end{aligned} \tag{35}
$$

V(i,x): the x component of the unit vector V(i) of the position shifting pattern i V(i,y): the y component of the unit vector V(i) of the position shifting pattern i In conditional expression (35), the term ImgH/Vh means the lateral dimension (number of lateral pixels) of a divided block, and the term ImgV/Vv means the longitudinal dimension (number of longitudinal pixels) of the divided block. Also in conditional expression (35), the terms (V(p1,x)+V(p2,x))/2 and (V(p1,y)+V(p2,y))/2 mean the average vectors of the unit vectors of two position shifting patterns, respectively. When the flags FSh and FSv are set, both the horizontal and vertical block division counts have reached their upper limit block division counts. The horizontal and vertical components of the unit vector are, therefore, kept used.

Figure 11:
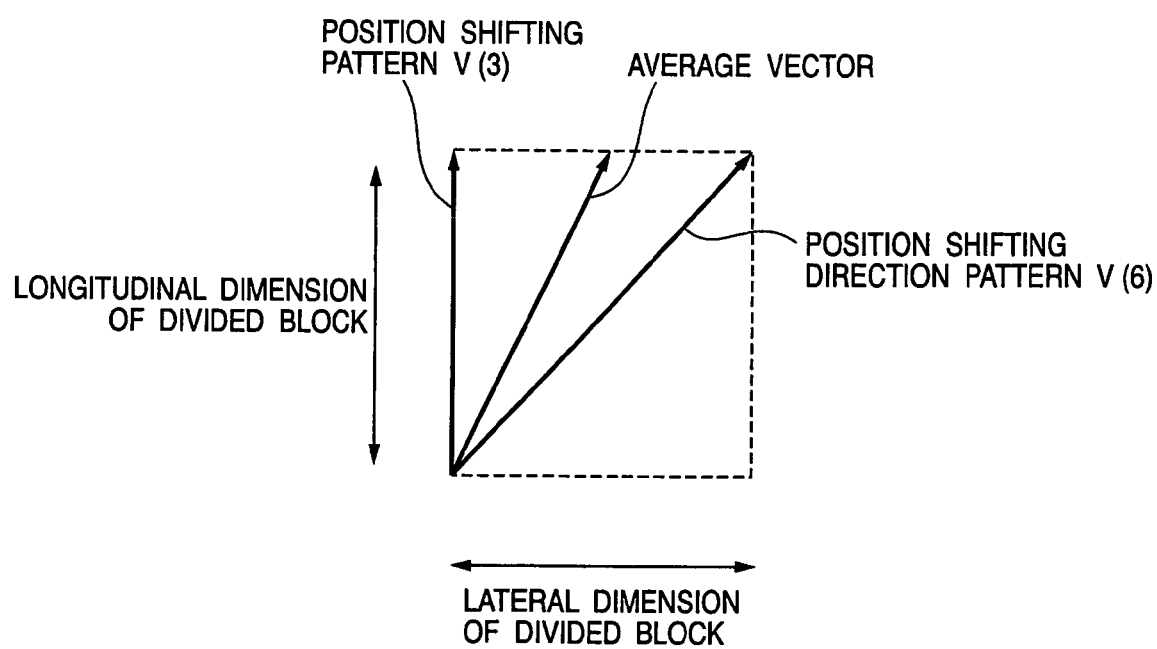
FIG. 11 is a view for explaining a position correction amount calculation method according to the first embodiment of the present invention.

Letting V(3) be the first position shifting pattern and V(6) be the second position shifting pattern, the average vector is represented as shown in FIG. 11.

Assume that five position shifting patterns are used, and a position shift corresponding to the diagonal component of a block is to be corrected, like position shifting pattern 6. In this case, if horizontal position shifting pattern 2 and vertical position shifting pattern 3 are averaged, the average becomes ½ of the magnitude of position shifting pattern 6 though the direction coincides with the vector of position shifting pattern 6. Thus, the upper limit of the position correction amount decreases. To prevent this, nine position shifting patterns are preferably used as shown in FIG. 9.

In step S512, the position correction amounts (Cx and Cy) and the first similarity distance Dmin are output.

Referring back to FIG. 2, after the end of comparison processing in step S210, a series of processes of multiplying the current block division count by β to calculate a block division count for the next recursive processing are executed in steps S211 to S218.

In step S211, it is determined whether both the products of the current horizontal and vertical block division counts (Vh and Vv) multiplied by β have exceeded upper limit block division counts (Dh_M and Dv_M).

If these products have exceeded the upper limit block division counts (Dh_M and Dv_M) (YES in step S211), the horizontal and vertical block division counts (Vh and Vv) are set as the upper limit block division counts (Dh_M and Dv_M) in step S212. Further, the flags FSh and FSv representing that the block division counts (Vh and Vv) have reached the upper limit block division counts (Dh_M and Dv_M) are set to 1. In step S213, the counter Km for performing processing using the block division counts as the upper limit block division counts is incremented by one, and the flow returns to step S209.

If both the products of the current horizontal and vertical block division counts (Vh and Vv) multiplied by β do not exceed the upper limit block division counts (Dh_M and Dv_M) in step S211 (NO in step S211), it is determined in step S214 whether the product of the current horizontal block division count Vh by β has exceeded the upper limit horizontal block division count Dh_M.

If the product has exceeded the upper limit horizontal block division count Dh_M (YES in step S214), the horizontal block division count Vh is set as the upper limit horizontal block division count Dh_M in step S215. The product of the current vertical block division count Vv multiplied by β is set as a new vertical block division count Vv. The flag FSh is set to 1, and then the flow returns to step S209.

If the product of the current horizontal block division count Vh by β does not exceed the upper limit horizontal block division count Dh_M (NO in step S214), it is determined in step S216 whether the product of the current vertical block division count Vv multiplied by β has exceeded the upper limit vertical block division count Dv_M. If the product has exceeded the upper limit vertical block division count Dv_M (YES in step S216), the vertical block division count Vv is set as the upper limit vertical block division count Dv_M in step S217. The product of the current horizontal block division count Vh multiplied by β is set as a new horizontal block division count Vh. The flag FSv is set to 1, and then the flow returns to step S209.

If the product of the current vertical block division count Vv multiplied by β does not exceed the upper limit vertical block division count Dv_M (NO in step S216), the products of the current horizontal and vertical block division counts (Vh and Vv) multiplied by β are set in step S218 as new block division counts (Vh and Vv) for the next recursive processing. After that, the flow returns to step S209.

In step S209, it is determined whether the end condition of recursive processing is satisfied. If the end condition is not satisfied (NO in step S209), recursive processing from step S210 is executed under a new end condition. If the end condition is satisfied (YES in step S209), the latest position correction amounts (Cx and Cy) are reflected in the comparison region of the comparison source image, and position correction for the comparison region of the comparison source image is executed in step S219. As a result, final position correction ends.

In step S220, difference image generation processing is executed. The obtained difference image is displayed on, e.g., the display device 108.

In difference image generation processing, difference information (difference image) in the comparison region between a pair of comparison images having optimally undergone position correction is acquired. In the difference image, the positions of pixels whose pixel values are equal to or larger than a predetermined threshold are stored. If the comparison source image is a color image, it is converted into a grayscale image. Pixels whose pixel values are equal to or larger than the threshold are overlaid and displayed in a predetermined color (e.g., prominent color such as red) on the grayscale image.

Details of difference image generation processing in step S220 will be explained with reference to FIG. 12.

Figure 12:
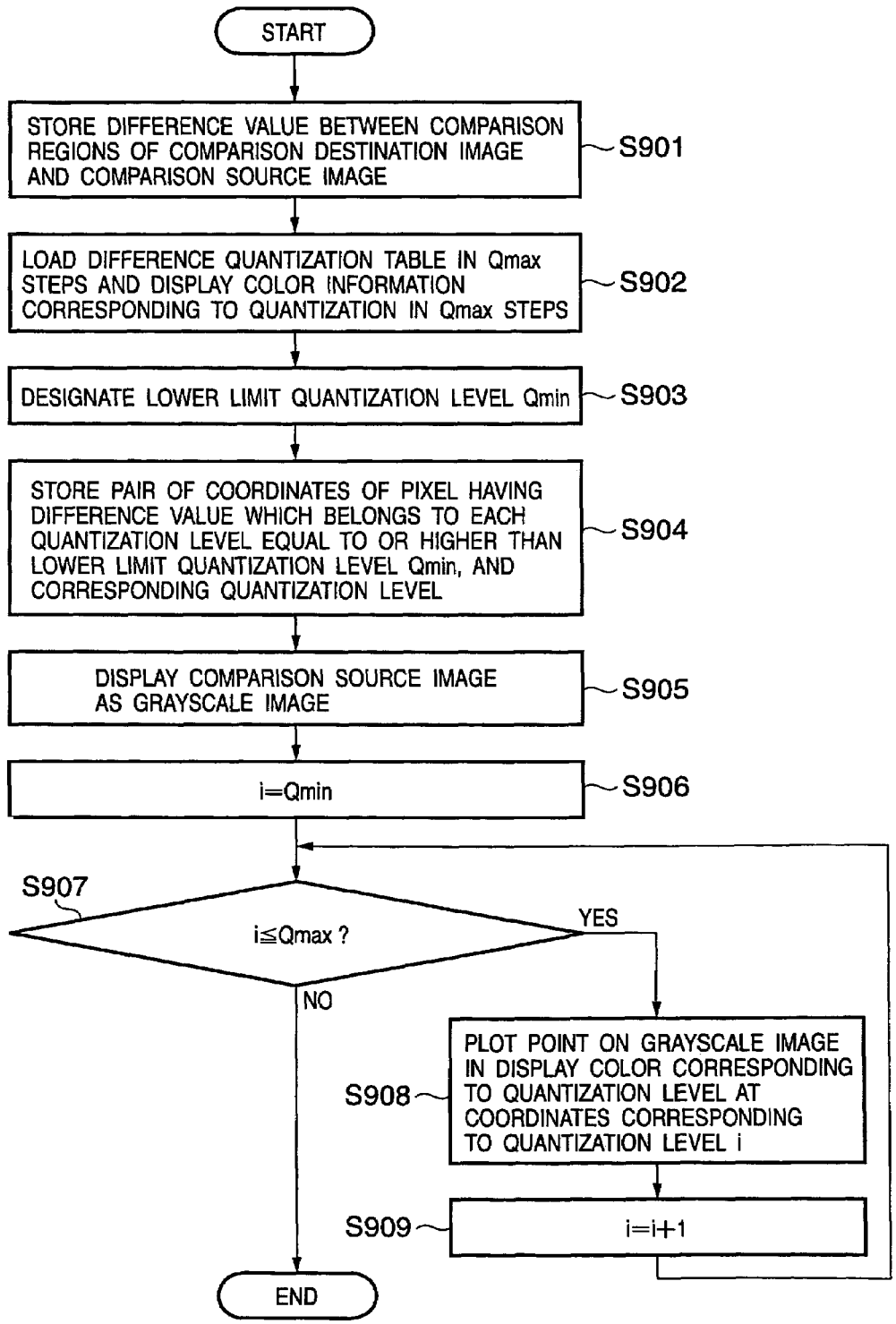
FIG. 12 is a flowchart showing details of difference image generation processing according to the first embodiment of the present invention.

FIG. 12 is a flowchart showing details of difference image generation processing according to the first embodiment of the present invention.

In step S901, the difference value of a pixel value in the comparison region of a comparison source image is calculated from a corresponding pixel value in the comparison region of a comparison destination image. Only positive difference values are paired with coordinates in the comparison region of the comparison destination image, and the pairs are stored in a memory.

The reason why only an image of a positive value is used is to display a comparison source image serving as a reference image as a grayscale image, and to highlight and display, on the grayscale image, defective pixels which exist in a comparison destination image but do not exist in the reference image.

In step S902, a difference quantization table for quantizing a difference value in Qmax steps, and display color information (setting) of a pixel that belongs to each quantization step are loaded.

The difference quantization table is different between generation of a difference image using color information and generation of a difference image using grayscale information. For this reason, the difference quantization table is switched to one appropriate for an image to be processed, and the switched table is loaded.

As for the display color information, in order to avoid confusion, when there are, e.g., three quantization steps, colors which have different hues and can be easily identified are selected:

(R, G, B)=(255,0,0), (0,255,0), (0,0,255)

With this setting, a difference corresponding to a difference value can be expressed by color such that the color is blue for a small error, green for a slightly large error, and red for a very large error.

In step S903, a lower limit quantization level Qmin used for display is designated. If the lower limit quantization level Qmin is set to Qmax, only a pixel having a very large difference value is displayed in a predetermined color (e.g., red).

In step S904, the coordinates of a pixel having a difference value which belongs to each quantization level equal to or higher than the lower limit quantization level Qmin are paired with the quantization level, and the pair is stored. In step S905, the comparison source image is displayed as a grayscale image.

In step S906, the quantization step i in process is initialized to Qmin. In step S907, it is determined whether the quantization step i is equal to or smaller than the maximum amount (quantization step Qmax).

If the quantization step i is equal to or smaller than the maximum amount (quantization step Qmax) (YES in step S907), a point is plotted in step S908 at a coordinate position corresponding to the quantization level i on the grayscale image in a display color corresponding to the quantization level. In step S909, the quantization level i is incremented by one to the next quantization level.

If the quantization step i is larger than the maximum amount (quantization step Qmax) (NO in step S907), i.e., processing at all the quantization steps i has ended, the processing ends.

By processing in FIG. 12, the difference of a comparison destination image from a comparison source image serving as a reference can be easily visually recognized in an intuitively easy-to-understand color corresponding to the difference after accurate alignment.

End condition determination processing in step S209 can be achieved by various methods. Several examples of determination processing will be explained.

Figure 13:
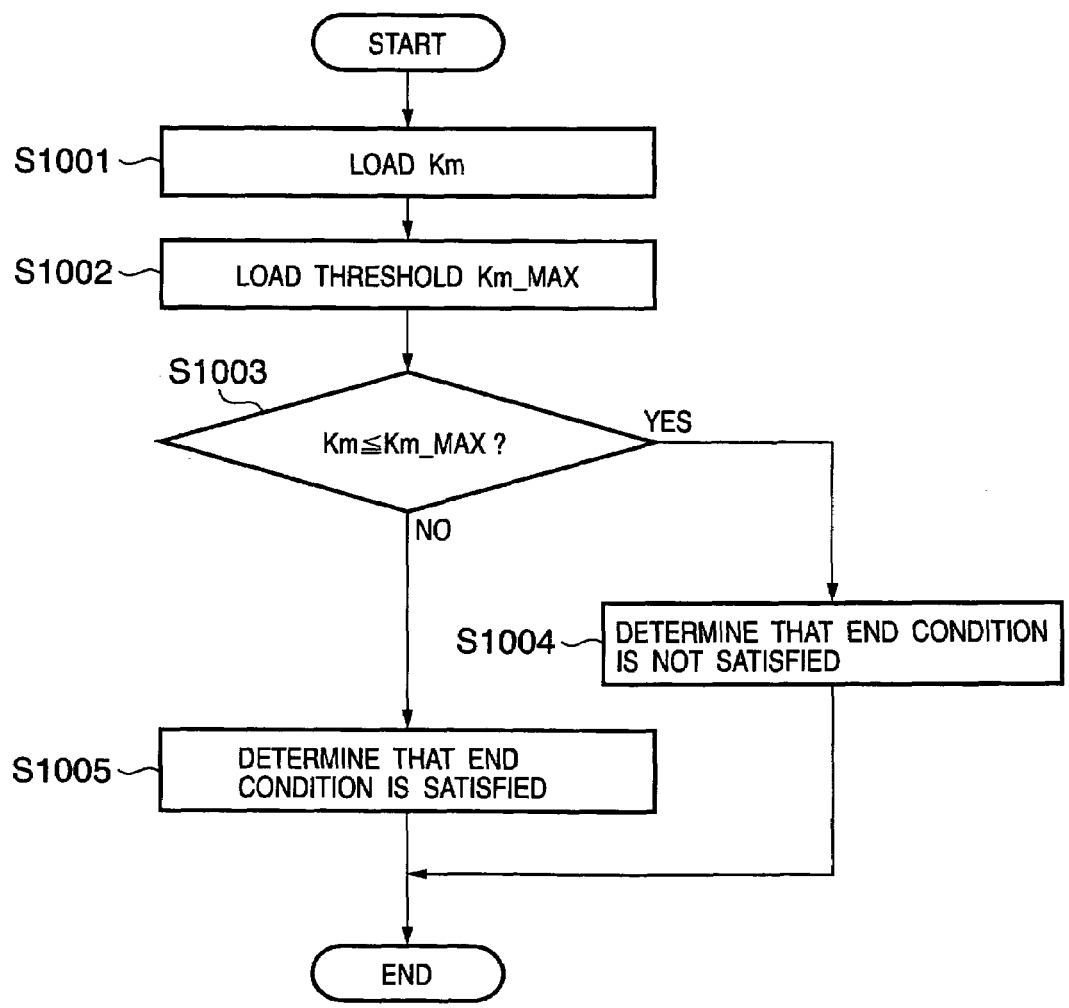
FIG. 13 is a flowchart showing an example of details of determination processing according to the first embodiment of the present invention.

FIG. 13 is a flowchart showing an example of details of determination processing according to the first embodiment of the present invention.

In step S1001, the value of the counter Km for performing processing using the block division count as the size of the comparison region is loaded. In step S1002, a limit count threshold Km_MAX for performing processing using the block division count as the size of the comparison region is loaded.

In step S1003, it is determined whether Km is equal to or smaller than Km_MAX. If Km is equal to or smaller than Km_MAX (YES in step S1003), it is determined in step S1004 that the end condition is not satisfied. If Km is larger than Km_MAX (NO in step S1003), it is determined in step S1005 that the end condition is satisfied.

By the above processing, even when position correction processing does not converge near a correct value at Km=0, comparison processing (FIG. 8) between a comparison source image and a comparison destination image (a comparison source region and a comparison destination region) using the block division count as the size of the comparison region can be so controlled as to be recursively repeated until Km reaches a certain value while the comparison position is slightly adjusted (corrected). Since the position of one pixel in one block can be slightly corrected several times in nine directions for each pixel at Km>0, position correction can be compensated to achieve convergence to a correct position correction amount.

An application to processing in FIG. 13 will be explained with reference to FIG. 14. Processing in FIG. 14 can further increase the efficiency of processing in FIG. 13.

Figure 14:
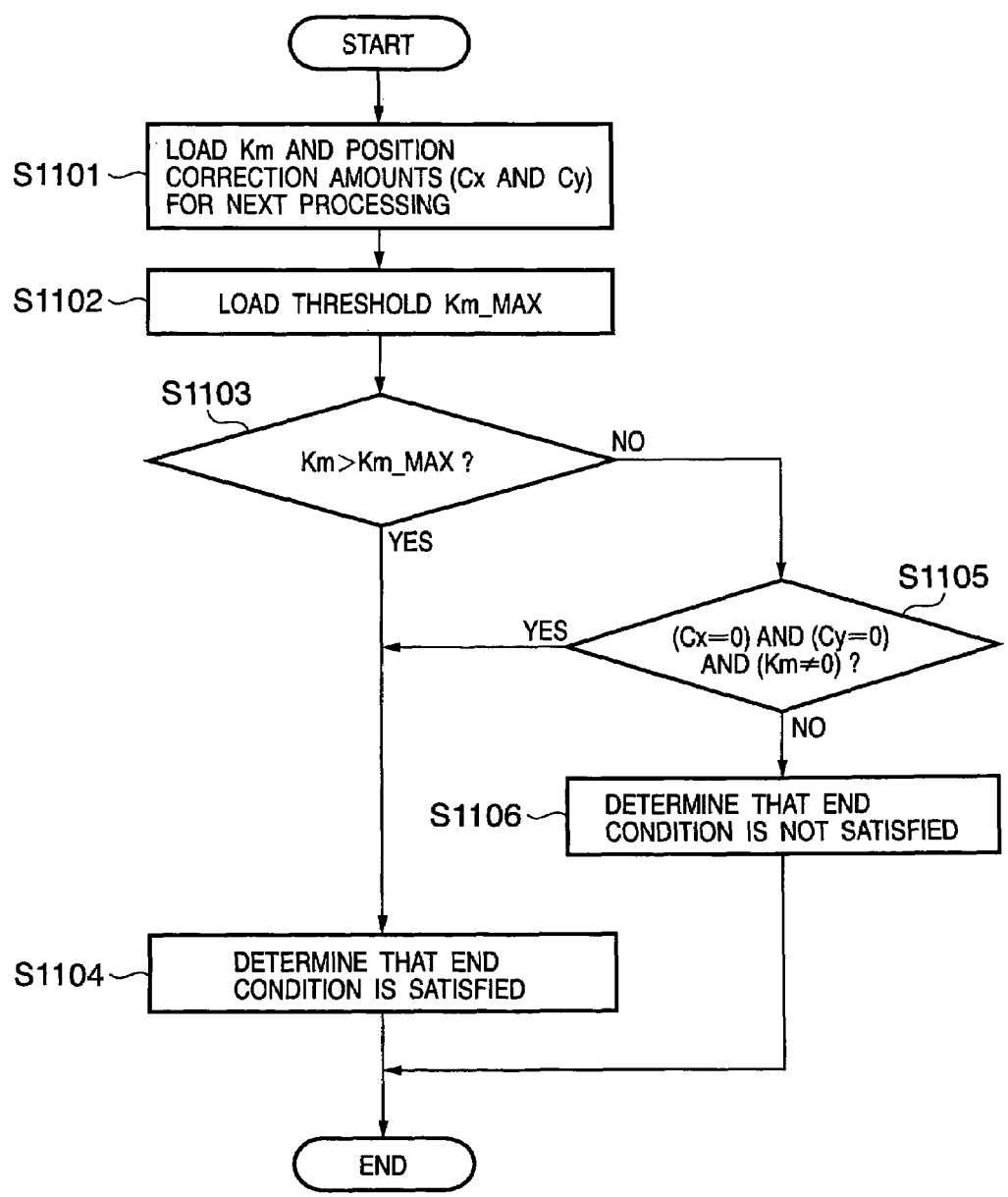
FIG. 14 is a flowchart showing another example of details of determination processing according to the first embodiment of the present invention.

FIG. 14 is a flowchart showing another example of details of determination processing according to the first embodiment of the present invention.

In step S1101, Km and the position correction amounts (Cx and Cy) for the next processing are loaded. In step S1102, the limit count threshold Km_MAX for performing processing using the block division count as the size of the comparison region is loaded.

In step S1103, it is determined whether Km is larger than Km_MAX. If Km is larger than Km_MAX (YES in step S1103), it is determined in step S1104 that the end condition is satisfied. If Km is equal to or smaller than Km_MAX (NO in step S1103), it is determined in step S1105 whether both the horizontal and vertical position correction amounts (Cx and Cy) are 0 and Km is not 0 (the flow has come to processing using the block division count as the size of the comparison region).

If both the horizontal and vertical position correction amounts (Cx and Cy) are 0 (YES in step S1105), it is determined in step S1104 that the end condition is satisfied. If neither of the horizontal and vertical position correction amounts (Cx and Cy) is 0 (NO in step S1105), it is determined in step S1106 that the end condition is not satisfied.

It is obvious in principle that once both the horizontal and vertical position correction amounts (Cx and Cy) become 0, they remain 0. Based on this property, processing is interrupted in FIG. 14.

Figure 15:
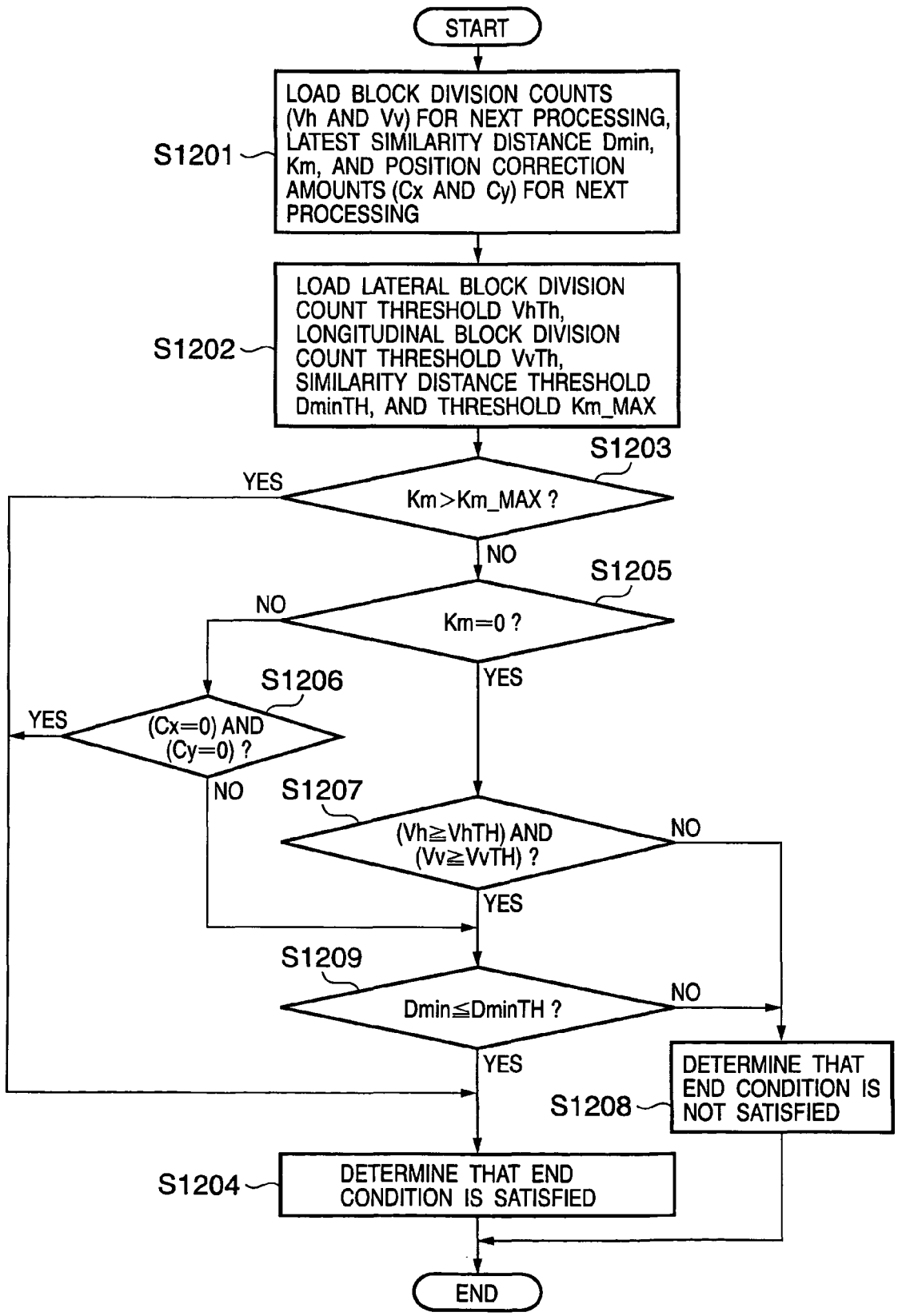
FIG. 15 is a flowchart showing still another example of details of determination processing according to the first embodiment of the present invention.

A further application to processing in FIG. 14 will be described with reference to FIG. 15. In FIG. 15, processing of ending recursive processing when the block division count has reached a predetermined one and the minimum similarity distance is equal to or smaller than a predetermined threshold even before the flow comes to processing using the block division count as the size of the comparison region is added to processing in FIG. 14.

FIG. 15 is a flowchart showing still another example of details of determination processing according to the first embodiment of the present invention.

In step S1201, Km and the position correction amounts (Cx and Cy) for the next processing are loaded. Further, the block division counts (Vh and Vv) for the next processing and the latest similarity distance Dmin are loaded. In step S1202, a minimum lateral block division count threshold VhTH and minimum longitudinal block division count threshold VvTH capable of stopping processing, and a similarity distance threshold DminTH for permitting the stop of processing are loaded. Also, the limit count threshold Km_MAX for performing processing using the block division count as the size of the comparison region is loaded.

In step S1203, it is determined whether Km is larger than Km_MAX. If Km is larger than Km_MAX (YES in step S1203), it is determined in step S1204 that the end condition is satisfied. If Km is equal to or smaller than Km_MAX (NO in step S1203), whether Km=0 is determined in step S1205.

If Km≠0 (NO in step S1205), it is determined in step S1206 whether both the horizontal and vertical position correction amounts (Cx and Cy) are 0. If both the horizontal and vertical position correction amounts (Cx and Cy) are 0 (YES in step S1206), it is determined in step S1204 that the end condition is satisfied. If neither of the horizontal and vertical position correction amounts (Cx and Cy) is 0 (NO in step S1206), it is determined in step S1209 whether the latest similarity distance Dmin is equal to or smaller than the similarity distance threshold DminTH.

If the similarity distance Dmin is equal to or smaller than the similarity distance threshold DminTH (YES in step S1209), it is determined in step S1204 that the end condition is satisfied. If the similarity distance Dmin is larger than the similarity distance threshold DminTH (NO in step S1209), it is determined in step S1208 that the end condition is not satisfied.

If Km=0 in step S1205 (YES in step S1205), it is determined in step S1207 whether both the horizontal and vertical block division counts (Vh and Vv) are respectively equal to or larger than the minimum lateral block division count threshold VhTH and minimum longitudinal block division count threshold VvTH capable of stopping processing.

If both the horizontal and vertical block division counts (Vh and Vv) are respectively smaller than the lateral block division count threshold VhTH and longitudinal block division count threshold VvTH (NO in step S1207), it is determined in step S1208 that the end condition is not satisfied. If both the horizontal and vertical block division counts (Vh and Vv) are respectively equal to or larger than the lateral block division count threshold VhTH and longitudinal block division count threshold VvTH (YES in step S1207), the flow advances to step S1209.

As described above, the first embodiment executes correction processing which solves the following problems in conventional processing of detecting the circumscribed rectangle region of an object in an image by threshold processing for a projection histogram. The problems are that the projection histogram is readily influenced by factors such as noise and a stain, and determination of the homothetic ratio on the basis of the poles and feature points of the projection histogram is also readily influenced by factors such as noise and a stain. To solve these problems, the first embodiment exploits the precondition in which a pair of images (comparison source image and comparison destination image) to be compared are homothetic. A best combination with which the two images become homothetic is determined using homothetic indices which are calculated in the vertical and horizontal directions by different methods. Then, correction processing of correcting a comparison region is performed.

Accordingly, a comparison region which less depends on an image, is less influenced by factors such as noise and a stain, and is used to compare images can be determined.

After correction processing is done, position shifting correction is accurately executed by translation to compare images. Similarity comparison processing can be achieved at high precision.

A characteristic arrangement of the first embodiment will be summarized as follows.

The projection histograms of two images A and B including objects which are assumed to be homothetic are calculated in the horizontal and vertical directions. The autocorrelations of the four obtained projection histograms are calculated, and shifting object sizes until the autocorrelations decrease to predetermined thresholds are calculated.

The quotient of the horizontal shifting object size of the image A divided by that of the image B is calculated as the first estimate value of the homothetic ratio of the circumscribed rectangle of the object. The quotient of the vertical shifting object size of the image A divided by that of the image B is calculated as the second estimate value of the homothetic ratio of the circumscribed rectangle of the object.

The quotient of the vertical shifting object size of the image A divided by the horizontal shifting object size of the image A is calculated as the first aspect ratio estimate value of the circumscribed rectangle of the object. The quotient of the vertical shifting object size of the image B divided by the horizontal shifting object size of the image B is calculated as the second aspect ratio estimate value of the circumscribed rectangle of the object.

The projection histograms of the images A and B are calculated in the horizontal and vertical directions to determine comparison region candidates serving as the circumscribed rectangles of objects.

The comparison region candidates are corrected on the basis of at least one of the estimate value of the homothetic ratio of the objects and the estimate value of the aspect ratio of the circumscribed rectangle of the object. The positions of the corrected comparison regions are accurately corrected in consideration of scaling, and a small difference between the comparison regions of the comparison source image and comparison destination image is detected.

The shifting object size is an observation amount free from the influence of an object position in an image, and has a smoothing effect of relaxing the influence of a stain or the like on the projection histogram. Since the projection histogram is evaluated after the normalized autocorrelation decreases to a predetermined threshold, the smoothing effect can be obtained to reduce the influence of a stain or the like on the projection histogram.

In correction of a comparison region candidate, an image for which it is known in advance that the circumscribed rectangle of an object may have a value larger than an original value owing to a stain or the like is defined as the image $\beta$. An image for which it is known in advance that the influence of a stain or the like is smaller than that on the image A and the circumscribed rectangle of an object can be expected to have a value close to the original value is defined as the image $\alpha$. The two images are prioritized, and the comparison region candidate of the image $\beta$ is corrected preferentially to that of the image $\alpha$.

According to another method, the average of the first aspect ratio estimate value of the circumscribed rectangle of the object and the second aspect ratio estimate value of the circumscribed rectangle of the object is calculated. An image having the aspect ratio of a comparison region candidate that corresponds to a smaller one of the differences between the average and the aspect ratios of the comparison region candidates of the comparison source image and comparison destination image is defined as the image $\alpha$ which can be expected to have a value close to an original value. The other image is defined as the image $\beta$ which may have a value different from the original value. The two images are prioritized, and the comparison region candidate of the image $\beta$ is corrected preferentially to that of the image $\alpha$.

According to still another method, the average of the first aspect ratio estimate value of the circumscribed rectangle of the object and the second aspect ratio estimate value of the circumscribed rectangle of the object is calculated. When a smaller one of the differences between the average and the aspect ratios of the comparison region candidates of the two images is smaller than a predetermined threshold, an image having the aspect ratio of the comparison region candidate that corresponds to the smaller difference is defined as the image $\alpha$ which can be expected to have a value close to an original value. The other image is defined as the image $\beta$ which may have a value different from the original value. The two images are prioritized, and the comparison region candidate of the image $\beta$ is corrected preferentially to that of the image $\alpha$.

According to still another method, when a smaller one of the differences between the average and the aspect ratios of the comparison region candidates of the two images is equal to or larger than a predetermined threshold, an image for which it is known in advance that the circumscribed rectangle of an object may have a value larger than an original value owing to a stain or the like is defined as the image $\beta$. An image for which it is known in advance that the influence of a stain or the like is smaller than that on the image $\beta$ and the circumscribed rectangle of an object can be expected to have a value close to the original value is defined as the image $\alpha$. The two images are prioritized, and the comparison region candidate of the image $\beta$ is corrected preferentially to that of the image $\alpha$.

The comparison region candidates of the two prioritized images are corrected by the following processing branch.

When the difference between the first estimate value of the homothetic ratio and the second estimate value of the homothetic ratio is equal to or smaller than a predetermined threshold, the ratio of the horizontal sizes of the comparison region candidates and that of their vertical sizes are calculated. The absolute value of the difference between the ratio of the horizontal sizes and the first estimate value of the homothetic ratio is calculated. The absolute value of the difference between the ratio of the vertical sizes and the second estimate value of the homothetic ratio is calculated.

The absolute values of the two differences are compared. When the absolute value of the difference between the ratio of the horizontal sizes and the first estimate value of the homothetic ratio is smaller or equal, the horizontal and vertical sizes of the image $\beta$ are corrected using the first estimate value of the homothetic ratio and the horizontal and vertical sizes of the image $\alpha$.

When the absolute value of the difference between the ratio of the vertical sizes and the second estimate value of the homothetic ratio is smaller as a result of the comparison between the absolute values of the two differences, the horizontal and vertical sizes of the image $\beta$ are corrected using the second estimate value of the homothetic ratio and the horizontal and vertical sizes of the image α.

To the contrary, when the difference between the first estimate value of the homothetic ratio and the second estimate value of the homothetic ratio is larger than the predetermined threshold, and the difference between the first estimate value of the homothetic ratio and the ratio of the horizontal sizes of the comparison region candidates is equal to or smaller than a predetermined threshold, the vertical size of the image β is corrected using the vertical size of the comparison region candidate of the image α and the first estimate value of the homothetic ratio.

Moreover, when the difference between the first estimate value of the homothetic ratio and the second estimate value of the homothetic ratio is larger than the predetermined threshold, and the difference between the second estimate value of the homothetic ratio and the ratio of the horizontal sizes of the comparison region candidates is equal to or smaller than a predetermined threshold, the vertical size of the image β is corrected using the vertical size of the comparison region candidate of the image α and the second estimate value of the homothetic ratio.

Further, when the difference between the first estimate value of the homothetic ratio and the second estimate value of the homothetic ratio is larger than the predetermined threshold, and the difference between the first estimate value of the homothetic ratio and the ratio of the vertical sizes of the comparison region candidates is equal to or smaller than a predetermined threshold, the vertical size of the image β is corrected using the horizontal size of the comparison region candidate of the image α and the first estimate value of the homothetic ratio.

In addition, when the difference between the first estimate value of the homothetic ratio and the second estimate value of the homothetic ratio is larger than the predetermined threshold, and the difference between the second estimate value of the homothetic ratio and the ratio of the vertical sizes of the comparison region candidates is equal to or smaller than a predetermined threshold, the vertical size of the image β is corrected using the horizontal size of the comparison region candidate of the image α and the second estimate value of the homothetic ratio.

It is determined that the two comparison region candidates are not homothetic when the difference between the first estimate value of the homothetic ratio and the second estimate value of the homothetic ratio is larger than the predetermined threshold, the difference between the first estimate value of the homothetic ratio and the ratio of the horizontal sizes is larger than the predetermined threshold, the difference between the second estimate value of the homothetic ratio and the ratio of the horizontal sizes is larger than the predetermined threshold, the difference between the first estimate value of the homothetic ratio and the ratio of the vertical sizes is larger than the predetermined threshold, and the difference between the second estimate value of the homothetic ratio and the ratio of the vertical sizes is larger than the predetermined threshold. In this case, subsequent position correction processing and comparison processing are canceled.

Second Embodiment

The second embodiment is an application of the first embodiment. The second embodiment will describe an arrangement in which, if the comparison region candidates of a comparison source image and comparison destination image are homothetic in step S203 of FIG. 2, comparison region optimization processing (step S203a) as shown in FIG. 16 is executed.

After processing in step S203, the comparison region size of the image β out of the images α and β is corrected. At this stage, the coordinates of the comparison region in the circumscribed rectangle of an object are not determined.

Figure 17:
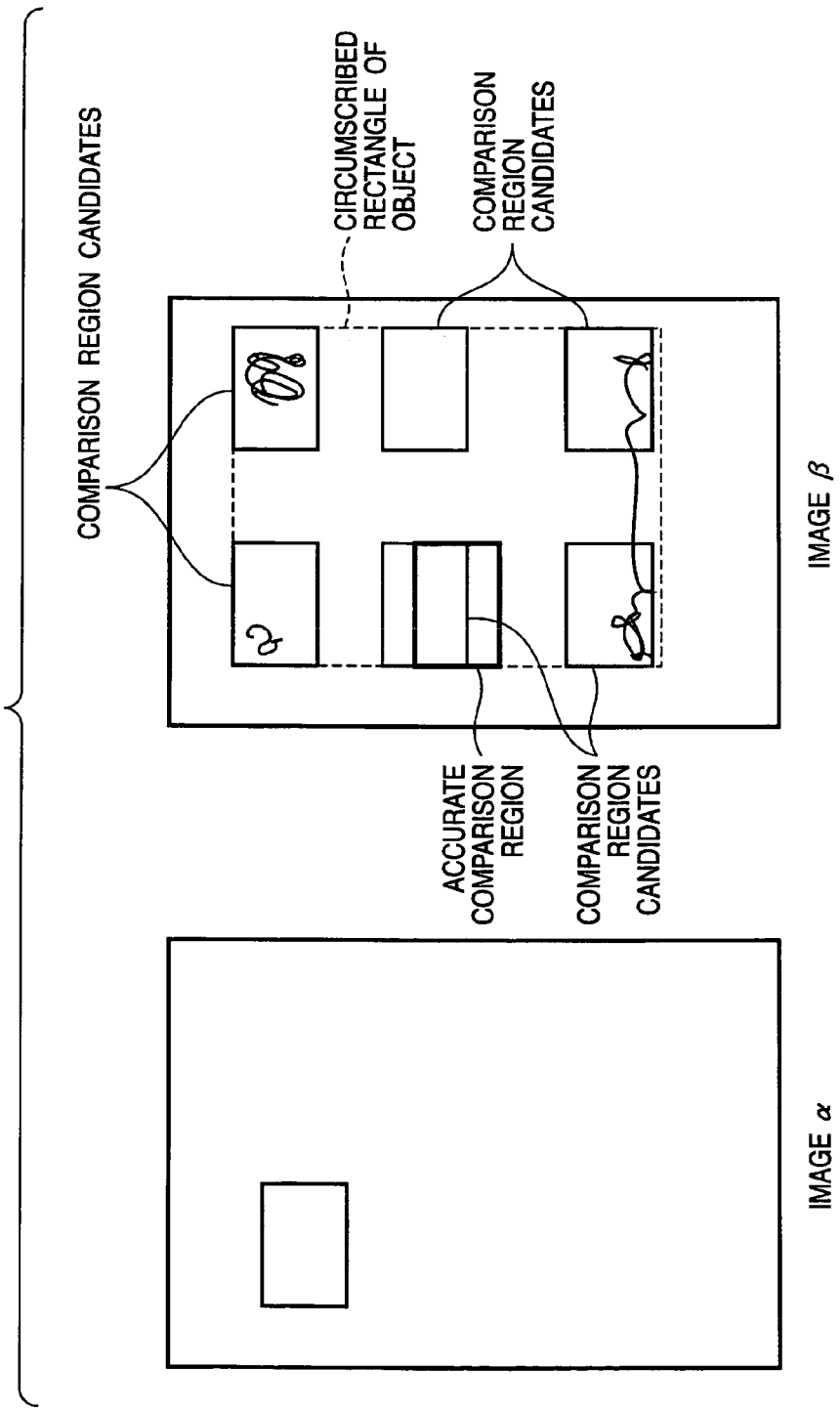
FIG. 17 is a view for explaining a case wherein a plurality of comparison region candidates are set according to the second embodiment of the present invention.

This is because an image to be processed has an annotation, stain, or the like and the circumscribed rectangle of the object becomes large, as shown in FIG. 17.

Figure 16:
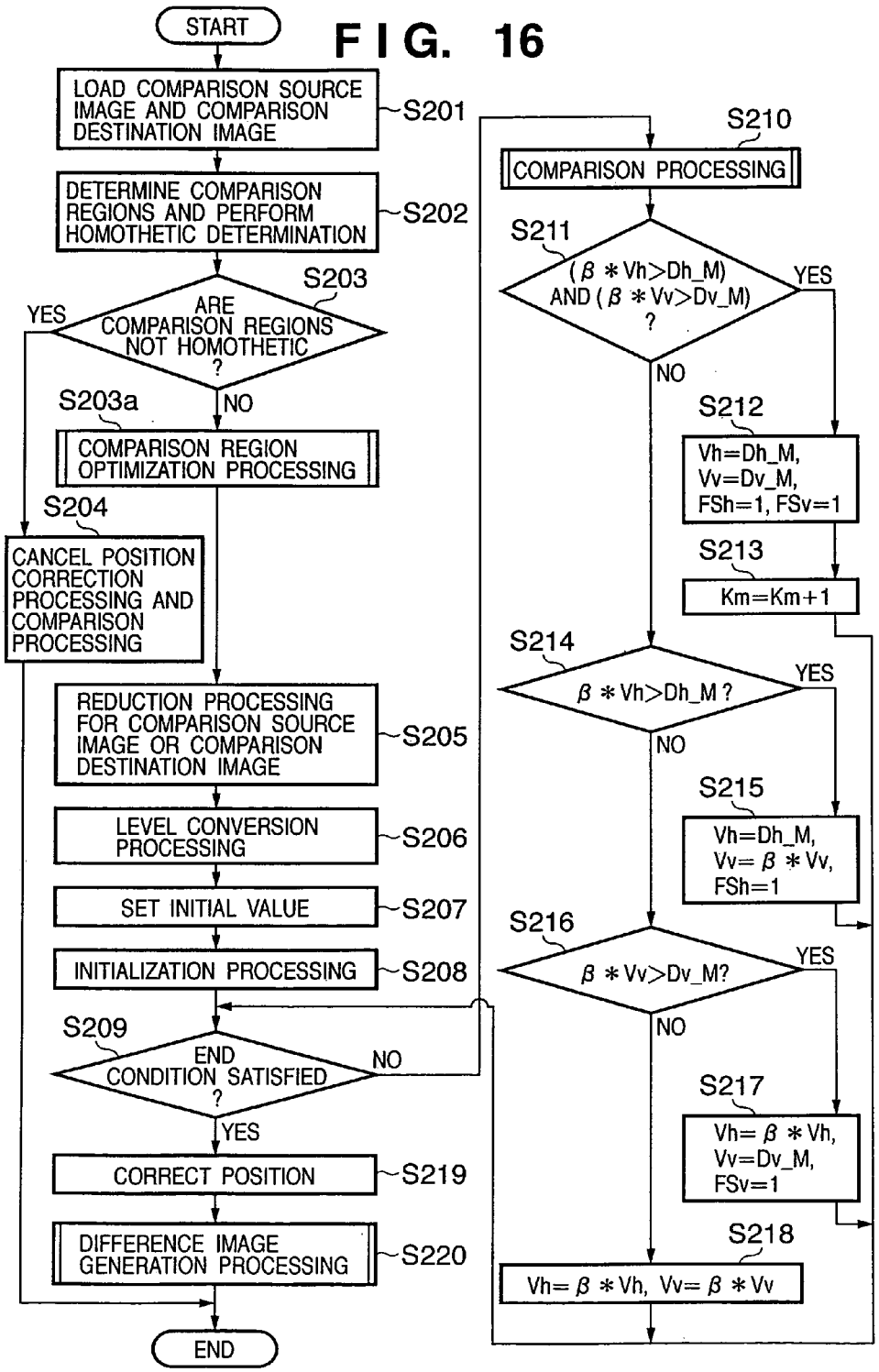
FIG. 16 is a flowchart showing an outline of processing by an image processing apparatus according to the second embodiment of the present invention.

In the second embodiment, as shown in FIG. 16, optimization processing of optimizing the coordinates of the comparison region is executed in step S203a, as shown in FIG. 16. This processing can safely absorb an error in an image to be processed by passing a more accurate comparison region to comparison processing which considers a subsequent translation position shift.

Details of optimization processing in step S203a will be explained with reference to FIG. 18.

Figure 18:
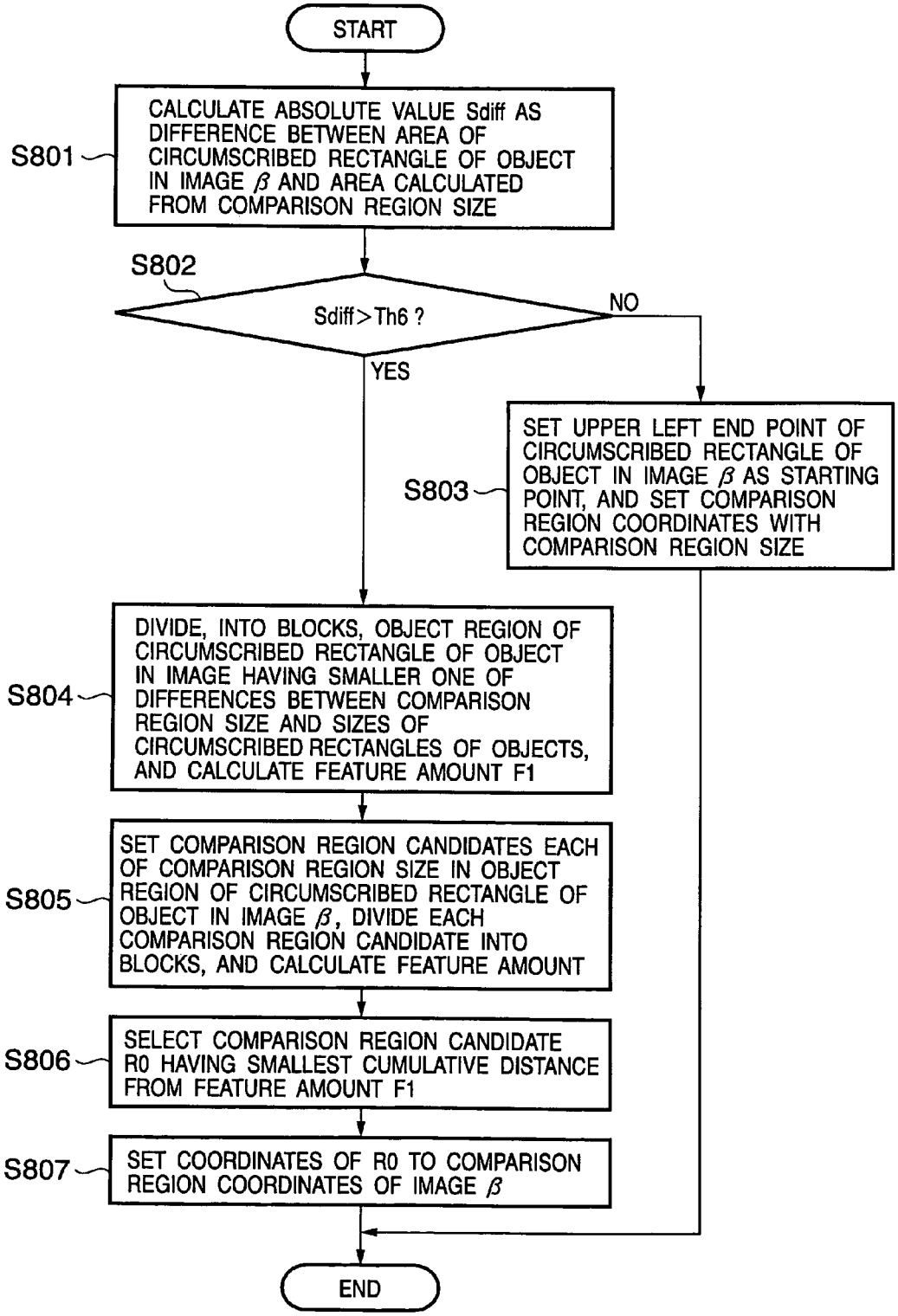
FIG. 18 is a flowchart showing details of optimization processing in step S203a according to the second embodiment of the present invention.

FIG. 18 is a flowchart showing details of optimization processing in step S203a according to the second embodiment of the present invention.

In step S801, an absolute value Sdiff of the area difference between the area of the circumscribed rectangle of an object in the image β and an area calculated from a comparison region size determined in step S202 is calculated.

In step S802, whether Sdiff≧Th6 is determined. If Sdiff<Th6 (NO in step S802), an arbitrary region of the comparison region size in the circumscribed rectangle of the object is set as a comparison region, and the coordinates of the region are set as optimal comparison region coordinates. For example, the upper left end point of the circumscribed rectangle of the object in the image β is set as a starting point, and comparison region coordinates corresponding to the comparison region size are set.

If Sdiff≧Th6 (YES in step S802), the circumscribed rectangle of the object in an image (image α or β) having a smaller one of the differences between the comparison region size and the sizes of the circumscribed rectangles of the objects in the images α and β is divided into blocks to calculate a feature amount F1 in step S804.

In step S805, comparison region candidates each of the comparison region size are set in the object region of the circumscribed rectangle of the object in the image β. Each comparison region candidate is divided into blocks to calculate a feature amount. In the example of FIG. 17, six comparison region candidates each of the comparison region size are set in the object region of the circumscribed rectangle of the object in the image β. Each comparison region candidate is divided into blocks to calculate a feature amount.

In FIG. 17, six comparison region candidates are exemplified. However, the number of comparison region candidates is not limited to this.

In step S806, the cumulative distance (similarity) obtained by accumulating the differences between blocks is calculated between the feature amount F1 and the calculated feature amounts of the comparison region candidates. A comparison region candidate R0 having the smallest cumulative distance (highest similarity) is selected.

In step S807, the coordinates of the comparison region candidate R0 are set to the comparison region coordinates of the image β. Accordingly, an initial value which can safely converge an error can be given to comparison processing which considers a subsequent translation position shift.

As described above, in addition to the effects described in the first embodiment, the second embodiment sets a plurality of comparison region candidates in the circumscribed rectangle region of an object in order to estimate the position in consideration of especially the possibility that no likelihood position can be estimated in correction of the comparison region size. The feature amounts of these comparison region candidates are calculated and compared with the feature amount of the circumscribed rectangle region of an object that need not be corrected. A comparison region candidate having a highest similarity is selected as a result of the comparison, and defined as a comparison region. Hence, the initial value of comparison processing which considers a subsequent position shift can be properly set. Robust similarity comparison processing at high precision free from the influence of factors such as noise, an annotation, and a stain can be implemented.

A characteristic arrangement of the second embodiment will be summarized as follows.

Two images to be compared are input, and the circumscribed rectangles of objects in the two images to be compared and comparison region sizes in the circumscribed rectangles are determined. Optimal comparison region coordinates are determined from the circumscribed rectangle of the object and the comparison region size in the circumscribed rectangle, and the initial state of comparison processing is determined.

That is, the comparison region size of the image β out of the two images to be processed is corrected. At this stage, the coordinates of the comparison region in the circumscribed rectangle of the object are not determined.

This is because the circumscribed rectangle of the object becomes large owing to an annotation, stain, or the like.

When the initial state of comparison processing is determined, an appropriate comparison region is determined as an initial value in order to safely absorb a subsequent translation position shift.

In determination, when the difference between the comparison region size and the size of the circumscribed rectangle of the object in the image β is smaller than a predetermined threshold, an arbitrary region of the comparison region size in the circumscribed rectangle of the object is defined as a comparison region, and the coordinates of the comparison region are defined as optimal comparison region coordinates.

When the difference between the comparison region size and the size of the circumscribed rectangle of the object in the image β is equal to or larger than the predetermined threshold, the circumscribed rectangle of the object in an image (image α or β) having a smaller one of the differences between the comparison region size and the sizes of the circumscribed rectangles of the objects in the images α and β is divided into blocks to calculate the feature amount F1.

A plurality of comparison region candidates each of the comparison region size are set in the object region of the circumscribed rectangle of the object in the image (image α or β) having a smaller one of the differences between the comparison region size and the sizes of the circumscribed rectangles of the objects in the images α and β. Each comparison region candidate is divided into blocks to calculate a feature amount. The cumulative distance obtained by accumulating the differences between blocks is calculated between the feature amount F1 and the calculated feature amounts of the comparison region candidates. The coordinates of a comparison region candidate having a smallest cumulative distance are set as optimal comparison region coordinates. At this time, the block division count may be small, i.e., the resolution may be low.

A comparison region determined by the arrangement of the first embodiment or a comparison region determined by the arrangement of the second embodiment is divided into a plurality of blocks by designated block division counts (horizontal (lateral) and vertical (longitudinal) block division counts).

A characteristic arrangement common to the first and second embodiments will be described below.

The feature amount of the comparison region is calculated for each block. In similarity comparison between the comparison regions, the similarity distance between the comparison source region and the comparison destination region after the position of the comparison source image is shifted using a plurality of types of position shifting patterns for shifting the position is calculated on the basis of the calculated feature amount.

A position correction amount for correcting the position of the comparison source region for the next similarity comparison is calculated on the basis of the size of a divided block and a position shifting pattern corresponding to the smallest similarity distance (or this position shifting pattern and a position shifting pattern corresponding to the second smallest cumulative distance which falls within a threshold obtained from the smallest cumulative distance) among calculated similarity distances.

Every time the position correction amount is calculated, a block division count larger than a block division count in previous similarity comparison is designated, and recursive processing of recursively executing the above processing is executed. In addition, every time the position correction amount is calculated, it is determined whether to end recursive processing. If it is determined to end recursive processing, a position correction amount at this time is finalized as a final position correction amount of the comparison source region.

After the position of the comparison source region is corrected by an optimal position correction amount, the comparison source region can be compared with the comparison destination region. Accordingly, difference information (e.g., difference image) between the comparison source region and the comparison destination region can be generated.

When the comparison source region and comparison destination region are different in size, equalization processing of making comparison regions the same (equal) before block division is preferably performed in terms of the property of block division. In equalization processing, the homothetic ratio of the comparison source image and comparison destination image is calculated, and at least one of the comparison source region and comparison destination region is scaled (enlarged/reduced) on the basis of the calculated homothetic ratio so as to make the sizes of the comparison source region and comparison destination region equal to each other. By performing similarity comparison using the comparison source region and comparison destination region after scaling, strict similarity comparison can be achieved.

When the feature amount level such as the number of colors or the number of gray levels is different between comparison regions, similarity comparison is preferably performed at the same feature amount level. For this reason, when the feature amount level is different between comparison regions and the comparison regions are a color image and grayscale image, the color image is converted into a grayscale image, which is stored as a feature amount calculation image at a stage prior to calculation of the feature amount. If at least one of the comparison regions is a binary image, the other is converted into a binary image, which is stored as a feature amount calculation image. Calculation of the feature amount of the comparison region uses the stored block feature amount calculation image.

In order to increase the speed of alignment processing between comparison regions, when both the comparison regions are color images, they may be converted into grayscale images, which may be stored as feature amount calculation images, in addition to the above processing.

In calculating the feature amount of each block, when both the comparison regions are color images, the average of color channels of each color image is defined as a feature amount. When the comparison regions are a color image and grayscale image or both of them are grayscale images, an average brightness is defined as a feature amount. When at least one of the comparison regions is a binary image, a value which is a majority of each binary block is defined as a feature amount. This arrangement can absorb the difference in feature amount level between comparison regions.

In generating difference information between comparison regions, when both the comparison regions are color images, difference information in the color information is generated. If both the comparison regions are grayscale images, or one of the comparison regions is a color image and the other is a grayscale image, difference information in the grayscale information is generated. When at least one of the comparison regions is a binary image, difference information in the binary information is generated.

When equalization processing for the sizes of comparison regions is executed, difference information is generated from the comparison regions after equalization processing.

In calculating a similarity distance, position shifting directions for each block that are defined by position shifting patterns are at least a total of five directions: two horizontal directions, two vertical directions, and one fixed direction. In order to assure convergence of processing of accurately performing fine position correction while increasing the block division count in recursive processing, a total of nine directions: two horizontal directions, two vertical directions, four oblique directions, and one fixed direction are preferably employed.

In increasing the block division count, the longitudinal block division count is increased, and saturation processing of limiting an increase in longitudinal block division count so as not to exceed a predetermined upper limit longitudinal block division count is performed. Similarly, the lateral block division count is increased, and saturation processing of limiting an increase in lateral block division count so as not to exceed a predetermined upper limit lateral block division count is performed. When the increased longitudinal and lateral block division counts do not exceed the upper limit longitudinal and lateral block division counts, no saturation processing is done, and these block division counts are increased and updated as block division counts to be newly applied to comparison regions.

In calculating a position correction amount, when there is a position shifting direction corresponding to the second smallest cumulative distance which falls within the product of the smallest similarity distance multiplied by the first constant, a direction vector as the average between the position shifting direction corresponding to the second smallest cumulative distance and a position shifting direction corresponding to the smallest similarity distance is acquired. When there is no position shifting direction corresponding to the second smallest cumulative distance which falls within the product of the smallest similarity distance multiplied by the first constant, the direction vector of the smallest similarity distance is acquired.

When the longitudinal block division count is increased and reaches a predetermined upper limit longitudinal block division count, and saturation processing is performed, the longitudinal component of the correction direction vector serving as a position correction amount is set to the value of the longitudinal component of the acquired direction vector. The lateral component of the correction direction vector is set to the product of the lateral component of the acquired direction vector multiplied by the lateral block division count.

When the lateral block division count is increased and reaches a predetermined upper limit lateral block division count, and saturation processing is performed, the lateral component of the correction direction vector serving as a position correction amount is set to the value of the lateral component of the acquired direction vector. The longitudinal component of the correction direction vector is set to the product of the longitudinal component of the acquired direction vector multiplied by the longitudinal block division count.

When the longitudinal and lateral block division counts are increased and reach their upper limit longitudinal and lateral block division counts, and no saturation processing is performed, the longitudinal and lateral components of the correction direction vector serving as a position correction amount are set to the products of the longitudinal and lateral components of the acquired direction vector multiplied by the longitudinal and lateral block division counts.

One of end conditions for recursive processing is that recursive processing has been executed a predetermined number of times while the longitudinal and lateral block division counts have reached predetermined upper limit longitudinal and lateral block division counts, as shown in FIG. 13. Alternatively, as shown in FIG. 14, if the position correction amount changes to 0 while recursive processing is repeated a predetermined number of times, position correction has been converged, and thus recursive processing may be ended. Alternatively, as shown in FIG. 15, recursive processing may be ended when the longitudinal and lateral block division counts have reached predetermined upper limit longitudinal and lateral block division counts and the similarity distance at this time becomes smaller than a predetermined threshold.

The upper limit longitudinal and lateral block division counts generally suffice to be the longitudinal and lateral dimensions of each comparison region. However, if image degradation or the like occurs, block division counts for a block of two pixels×two pixels may be designated as integral fractions of the longitudinal and lateral dimensions to obtain a smoothing effect.

Block division counts for the next similarity comparison can be easily designated by multiplying current block division counts by a constant. The constant is larger than 1.0 and is desirably about 2.0, and its upper limit is smaller than 3.0 at maximum. This is because position correction processing hardly converges for an excessively large constant.

In generating difference information, when both the comparison regions are color images after equalization processing for the sizes of the comparison regions, difference information in the color information is generated. If both the comparison regions are grayscale images, or one of the comparison regions is a color image and the other is a grayscale image, difference information in the grayscale information is generated. When at least one of the comparison regions is a binary image, difference information in the binary information is generated.

The difference information is, e.g., a pixel difference value between corresponding pixels in comparison regions after position shifting correction, statistical information of the pixel difference value, or quantization information of the pixel difference value. Also, the difference information is the quotient calculated by dividing, by the total number of pixels in the comparison region, the cumulative pixel value of a pixel difference value between corresponding pixels in comparison regions after position shifting correction, that is, the difference information is a difference index attributed to one pixel. Alternatively, coordinate information of comparison regions which are converted into the sizes of a comparison source image and comparison destination image before equalization processing for the sizes of the comparison regions may be used, and processing according to the present invention may be adopted as pre-processing for post-processing which requires accurate alignment. An arbitrary combination of these pieces of information may be used as difference information.

In generating difference information, a pixel difference value between corresponding pixels in a comparison source region and comparison destination region after position shifting correction is calculated. Then, a pixel whose pixel difference value is equal to or larger than a predetermined threshold is determined, and the pixel difference value of the pixel is quantized at a plurality of quantization steps. The quantization level and the position of the pixel are paired and stored. When the comparison source image is a color image, it is converted into a grayscale image. A lower limit quantization level for displaying a difference is designated, and pixels whose quantization levels are equal to or lower than the lower limit quantization level are displayed on the grayscale image in a color different for each quantization level. This makes it possible to intuitively recognize the difference between the comparison regions.

As a simpler method, a pixel difference value between corresponding pixels in a comparison source region and comparison destination region after position shifting correction is calculated. A pixel whose pixel difference value is equal to or larger than a predetermined threshold, and the position of the pixel are stored. When the comparison source image is a color image, it is converted into a grayscale image. Pixels whose pixel difference values are equal to or larger than the predetermined threshold are displayed in a predetermined color (prominent color, e.g., red) on the grayscale image. With this simple processing, the difference between the comparison regions can be intuitively recognized.

By setting the predetermined threshold to a positive value including 0, only the difference of a comparison destination image from a comparison source image can be displayed in a predetermined color (prominent color).

When not a comparison source image but a comparison destination image is used as a reference, the same display of difference information between them can be done. In this case, a grayscale image to be displayed in the above description is a comparison destination image. As difference information between corresponding pixels in a comparison source region and comparison destination region after position shifting correction, the difference of a pixel value in the comparison destination region is calculated from a corresponding pixel value in the comparison source region.

Other Embodiment

According to the first and second embodiments, which of comparison region extraction processes for the images A and B is more accurate is determined on the basis of the estimate value of the aspect ratio of the circumscribed rectangle in steps S602 to S609 of FIG. 6A.

In this case, the comparison region of the image B is highly likely to be wrong such that the image A serving as a comparison destination image is stored image data, and the image B serving as a comparison source image is scanned data of an original which may have an annotation, stain, or the like, as described in the embodiment. In this case, it is also possible to simply set the A as the image α and the image B as the image β, i.e., set the comparison region of the image β, i.e., image B as a correction target in steps S605 to S609.

In this case, the estimate value of the homothetic ratio of the circumscribed rectangle of an object is used, but the estimate value of the aspect ratio of the circumscribed rectangle of the object need not be used. In this case, processes in steps S620, S621, S624, S625, S628, S629, S632, and S633 can be omitted to decrease the number of steps.

Unlike the environment in the above embodiments, an environment may be assumed in which an image whose comparison region is highly likely to be wrong cannot be specified. In this case, processes in steps S605 and S606 may be omitted. Determination of which of the comparison regions of the images A and B is to be corrected depends on only determination in step S607.

If E2>Th4, i.e., abs(SV(A)/SV(B)−R2)>Th4 in step S631, all determination results do not exhibit any homothetic ground. Thus, it is determined that comparison regions are not homothetic, and correction processing for the comparison regions is inhibited. In this case, subsequent comparison processing is canceled via steps S203 and S204 in FIG. 2, and the processing ends. Instead of this arrangement, the present invention can also adopt an arrangement which forcedly executes comparison processing, or an arrangement which executes comparison processing in accordance with the application purpose even if comparison regions are not corrected and the precision associated with comparison processing cannot be expected.

In the first and second embodiments, the homothetic ratio of comparison regions in a comparison source image and comparison destination image is calculated. An entire image having a larger comparison region is reduced on the basis of the homothetic ratio. In addition to this, coordinate information of the comparison region is also corrected in accordance with reduction processing. This makes the sizes of comparison regions in the comparison source image and comparison destination image equal to each other. However, the present invention is not limited to this.

For example, an entire image having a smaller comparison region is enlarged on the basis of the homothetic ratio, and the coordinates of the comparison region are also corrected in accordance with enlargement processing. This can also make the sizes of comparison regions in the comparison source image and comparison destination image equal to each other. This enlargement processing preferably adopts a method (e.g., affine transformation) which hardly degrades the image quality, in place of simple linear interpolation.

That is, according to the first and second embodiments, the sizes of comparison regions in a comparison source image and comparison destination image are made equal to each other by scaling (enlarging/reducing) one of the sizes of the comparison regions. Not one but both of the sizes of the comparison regions in the comparison source image and comparison destination image may be properly scaled as far as the comparison regions become equal to each other.

In the first and second embodiments, the feature amount levels (number of colors and number of gray levels) of a comparison source image and comparison destination image are converted by adjusting the image of a higher feature amount level to that of a lower feature amount level. However, the present invention is not limited to this. For example, these images may be unconditionally converted to have a low feature amount level (number of colors and number of gray levels) in favor of a higher speed.

For example, when both a comparison source image and comparison destination image are color images, 3-channel information must be processed. If, however, these color images are converted into grayscale images, the channel information is reduced to 1-channel information, and the cost of comparison processing reduces to roughly ⅓.

In the first and second embodiments, a difference image by difference image generation processing is overlaid and displayed by changing the color of pixels different at a plurality of quantization levels. However, the present invention is not limited to this.

That is, the pixel difference value of two corresponding pixels in the comparison regions of a comparison source image and comparison destination image after position shifting correction is calculated. Of pixel difference values, a pixel difference value which is equal to or larger than a predetermined threshold is stored in correspondence with the position of the pixel. If the comparison source image is a color image, it is converted into a grayscale image. Pixels whose pixel difference values are equal to or larger than the predetermined threshold are displayed in a predetermined color on the grayscale image. A display which allows the user to intuitively recognize the difference between the comparison regions can be presented.

In displaying a difference image, the quotient calculated by dividing a cumulative pixel difference value in the comparison region of a comparison image by the number of pixels in the comparison region may be displayed as an expected value of difference per pixel, in place of the above-mentioned image information. Needless to say, both of these values may be displayed, or a composite display form may be employed such that the comparison region is enclosed in a rectangle or blinked, in order to enhance the visibility of image display.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-004347, filed on Jan. 11, 2005, which is hereby incorporated by reference herein in its entirety.

What is claimed is:

1. An image processing apparatus which executes image processing of determining a comparison region used to perform similarity comparison between a comparison source image and a comparison destination image, comprising:
    histogram calculation means for calculating horizontal and vertical projection histograms of the comparison source image and the comparison destination image;
    object size calculation means for calculating autocorrelation values of the horizontal and vertical projection histograms which are calculated by said histogram calculation means, and calculating horizontal and vertical object sizes until the autocorrelation values decrease to predetermined thresholds;
    aspect ratio estimate value calculation means for calculating an aspect ratio estimate value of a circumscribed rectangle of an object serving as a comparison region candidate in the comparison source image and the comparison destination image, on the basis of calculation results of said object size calculation means; and
    comparison region determination means for correcting the comparison region candidate on the basis of the aspect ratio estimate value calculated by said aspect ratio estimate value calculation means, and determining a final comparison region.

2. The apparatus according to claim 1, further comprising homothetic ratio calculation means for calculating a homothetic ratio estimate value of circumscribed rectangles of objects serving as comparison region candidates in the comparison source image and the comparison destination image on the basis of the calculation results of said object size calculation means, wherein said comparison region determination means corrects the comparison region candidate on the basis of the aspect ratio estimate value calculated by said aspect ratio estimate value calculation means and the homothetic ratio estimate value calculated by said homothetic ratio calculation means, and determines the final comparison region.

3. The apparatus according to claim 2, wherein said homothetic ratio calculation means calculates a first homothetic ratio estimate value in a horizontal direction and a second homothetic ratio estimate value in a vertical direction between the circumscribed rectangles of the objects serving as the comparison region candidates in the comparison source image and the comparison destination image on the basis of the calculation results of said object size calculation means.

4. The apparatus according to claim 1, wherein said aspect ratio estimate value calculation means calculates a first aspect ratio estimate value of a circumscribed rectangle of an object serving as a comparison region candidate in the comparison source image and a second aspect ratio estimate value of a circumscribed rectangle of an object serving as a comparison region candidate in the comparison destination image on the basis of the calculation results of said object size calculation means.

5. An image processing apparatus which executes image processing of determining a comparison region used to perform similarity comparison between a comparison source image and a comparison destination image, comprising:

calculation means for calculating projection histograms of the comparison source image and the comparison destination image;

comparison region candidate determination means for determining comparison region candidates used to perform similarity comparison between the comparison source image and the comparison destination image on the basis of the projection histograms calculated by said calculation means; and comparison region determination means for determining a final comparison region by correcting the comparison region candidates on the basis of at least one of aspect ratio estimate values of circumscribed rectangles of objects serving as comparison region candidates in the comparison source image and the comparison destination image that are calculated on the basis of the projection histograms calculated by said calculation means, and a homothetic ratio estimate value of the circumscribed rectangles of the objects serving as the comparison region candidates in the comparison source image and the comparison destination image.

6. The apparatus according to claim 5, wherein said comparison region determination means sets, of the comparison region candidates in the comparison source image and the comparison destination image, as an image β, an image A whose circumscribed rectangle of the object is known in advance to be likely to have a value different from an original value, sets, as an image α, an image B whose circumscribed rectangle of the object is known in advance to be expected to have a value closer to an original value than the circumscribed rectangle of the object of the image A, and corrects the image β preferentially to the image α to determine a final comparison region.

7. The apparatus according to claim 6, wherein said comparison region determination means sets each of the comparison region candidates in the comparison source image and the comparison destination image as the image α or the image β on the basis of an average of a first aspect ratio estimate value of the circumscribed rectangle of the object in the comparison source image, and a second aspect ratio estimate value of the circumscribed rectangle of the object in the comparison destination image.

8. The apparatus according to claim 6, wherein the homothetic ratio estimate value includes a first homothetic ratio estimate value in a horizontal direction and a second homothetic ratio estimate value in a vertical direction or the circumscribed rectangle of the object, and said comparison region determination means uses one of the image α and the image β to correct the other image on the basis of a difference between the first homothetic ratio estimate value and the second homothetic ratio estimate value.

9. The apparatus according to claim 8, wherein when the difference between the first homothetic ratio estimate value and the second homothetic ratio estimate value is not more than a predetermined threshold, said comparison region determination means uses one of a size of the image α and a size of the image β to correct the other image on the basis of a first absolute value of a difference between the first homothetic ratio estimate value and a first homothetic ratio in the horizontal direction between the comparison region candidates in the comparison source image and the comparison destination image, and a second absolute value of a difference between the second homothetic ratio estimate value and a second homothetic ratio in the vertical direction between the comparison region candidates in the comparison source image and the comparison destination image.

10. The apparatus according to claim 9, wherein when the difference between the first homothetic ratio estimate value and the second homothetic ratio estimate value is larger than the predetermined threshold, said comparison region determination means uses one of the first homothetic ratio estimate value and the second homothetic ratio estimate value and one of the size of the image α and the size of the image β to correct the other image on the basis of a first homothetic ratio, a second homothetic ratio, the first homothetic ratio estimate value, and the second homothetic ratio estimate value.

11. The apparatus according to claim 10, further comprising comparison means for executing similarity comparison between the comparison source image and the comparison destination image by using the comparison region determined by said comparison region determination means.

12. The apparatus according to claim 11, further comprising control means for canceling comparison by said comparison means on the basis of the first homothetic ratio, the second homothetic ratio, the first homothetic ratio estimate value, and the second homothetic ratio estimate value.

13. The apparatus according to claim 5, further comprising optimization means for optimizing coordinates of the comparison region determined by said comparison region determination means.

14. The apparatus according to claim 13, wherein said optimization means comprises area difference calculation means for calculating an area difference between an area of one of the circumscribed rectangles of the objects serving as the comparison region candidates in the comparison source image and the comparison destination image that is calculated on the basis of the projection histogram calculated by said calculation means, and an area of the comparison region determined by said comparison region determination means, and determination means for determining the coordinates of the comparison region on the basis of the area difference calculated by said area difference calculation means by using one of the circumscribed rectangles of the objects serving as the comparison region candidates in the comparison source image and the comparison destination image.

15. The apparatus according to claim 14, wherein when the area difference is smaller than a predetermined threshold, said determination means determines, as the coordinates of the comparison region, coordinates of an arbitrary region in the circumscribed rectangle of the object which has the area of the comparison region determined by said comparison region determination means and is used for calculation by said area difference calculation means.

16. The apparatus according to claim 14, wherein
said determination means comprises
  first calculation means for calculating a first feature amount by dividing, into blocks, a circumscribed rectangle of an object of an image having a smaller size difference out of size differences between a size of the comparison region determined by said comparison region determination means and sizes of the circumscribed rectangles of the objects serving as the comparison region candidates in the comparison source image and the comparison destination image,
  second calculation means for setting a plurality of comparison region candidates having the size of the comparison region in an object region of a circumscribed rectangle of an object of an image having a larger size difference, dividing each of the plurality of comparison region candidates into blocks, and calculating second feature amounts of the plurality of comparison region candidates,
  comparison means for comparing the first feature amount and the second feature amounts, and
  selection means for selecting one of the plurality of comparison region candidates on the basis of a comparison result of said comparison means,
when the area difference is not less than a predetermined threshold, said determination means determines coordinates of the comparison region candidate selected by said selection means as the coordinates of the comparison region.

17. A method of controlling an image processing apparatus which executes image processing of determining a comparison region used to perform similarity comparison between a comparison source image and a comparison destination image, comprising:

a histogram calculation step of calculating horizontal and vertical projection histograms of the comparison source image and the comparison destination image;

an object size calculation step of calculating autocorrelation values of the horizontal and vertical projection histograms which are calculated in the histogram calculation step, and calculating horizontal and vertical object sizes until the autocorrelation values decrease to predetermined thresholds;

an aspect ratio estimate value calculation step of calculating an aspect ratio estimate value of a circumscribed rectangle of an object serving as a comparison region candidate in the comparison source image and the comparison destination image, on the basis of calculation results of the object size calculation step; and correcting with a processor the comparison region candidate on the basis of the aspect ratio estimate value calculated in the aspect ratio estimate value calculation step, and determining a final comparison region.

18. A method of controlling an image processing apparatus which executes image processing of determining a comparison region used to perform similarity comparison between a comparison source image and a comparison destination image, comprising:

a calculation step of calculating projection histograms of the comparison source image and the comparison destination image;

a comparison region candidate determination step of determining comparison region candidates used to perform similarity comparison between the comparison source image and the comparison destination image on the basis of the projection histograms calculated in the calculation step; and determining with a processor a final comparison region by correcting the comparison region candidates on the basis of at least one of aspect ratio estimate values of circumscribed rectangles of objects serving as comparison region candidates in the comparison source image and the comparison destination image that are calculated on the basis of the projection histograms calculated in the calculation step, and a homothetic ratio estimate value of the circumscribed rectangles of the objects serving as the comparison region candidates in the comparison source image and the comparison destination image.

19. A non-transitory computer program stored on a computer readable medium for causing a computer to control an image processing apparatus which executes image processing of determining a comparison region used to perform similarity comparison between a comparison source image and a comparison destination image, characterized by causing the computer to execute a histogram calculation step of calculating horizontal and vertical projection histograms of the comparison source image and the comparison destination image, an object size calculation step of calculating autocorrelation values of the horizontal and vertical projection histograms which are calculated in the histogram calculation step, and calculating horizontal and vertical object size until the autocorrelation values decrease to predetermined thresholds, an aspect ratio estimate value calculation step of calculating an aspect ratio estimate value of a circumscribed rectangle of an object serving as a comparison region candidate in the comparison source image and the comparison destination image, on the basis of calculation results of the object size calculation step; and a comparison region determination step of correcting the comparison region candidate on the basis of the aspect ratio estimate value calculated in the aspect ratio estimate value calculation step, and determining a final comparison region.

20. A non-transitory computer program stored on a computer readable medium for causing a computer to control an image processing apparatus which executes image processing of determining a comparison region used to perform similarity comparison between a comparison source image and a comparison destination image, characterized by causing the computer to execute a calculation step of calculating projection histograms of the comparison source image and the comparison destination image, a comparison region candidate determination step of determining comparison region candidates used to perform similarity comparison between the comparison source image and the comparison destination image on the basis of the projection histograms calculated in the calculation step, and a comparison region determination step of determining a final comparison region by correcting the comparison region candidates on the basis of at least one of aspect ratio estimate values of circumscribed rectangles of objects serving as comparison region candidates in the comparison source image and the comparison destination image that are calculated on the basis of the projection histograms calculated in the calculation step, and a homothetic ratio estimate value of the circumscribed rectangles of the objects serving as the comparison region candidates in the comparison source image and the comparison destination image.

* * * * *